United States Patent
Staufer et al.

(10) Patent No.: US 12,003,961 B2
(45) Date of Patent: Jun. 4, 2024

(54) CONFIGURATION OF PROVISIONING PARAMETERS FOR ONBOARDING A DEVICE TO A NETWORK

(71) Applicant: Nokia Technologies Oy, Espoo (FI)

(72) Inventors: Markus Staufer, Munich (DE); Rainer Liebhart, Munich (DE); Devaki Chandramouli, Plano, TX (US); Markus Sakari Isomäki, Espoo (FI); Pekka Juhani Korja, Kauniainen (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 226 days.

(21) Appl. No.: 17/514,024

(22) Filed: Oct. 29, 2021

(65) Prior Publication Data

US 2023/0137814 A1  May 4, 2023

(51) Int. Cl.
*H04W 12/06* (2021.01)
*H04L 29/06* (2006.01)
*H04W 8/26* (2009.01)
*H04W 60/04* (2009.01)
*H04W 76/12* (2018.01)

(52) U.S. Cl.
CPC .......... *H04W 12/06* (2013.01); *H04W 8/265* (2013.01); *H04W 60/04* (2013.01); *H04W 76/12* (2018.02)

(58) Field of Classification Search
None
See application file for complete search history.

(56) References Cited

U.S. PATENT DOCUMENTS

| | | | |
|---|---|---|---|
| 2015/0074761 A1* | 3/2015 | Zhu | H04W 12/062 726/3 |
| 2020/0045541 A1* | 2/2020 | Kreishan | H04W 12/06 |
| 2021/0058784 A1 | 2/2021 | Kedalagudde et al. | |
| 2021/0211879 A1 | 7/2021 | Zisimopoulos et al. | |

OTHER PUBLICATIONS

"3rd Generation Partnership Project; Technical Specification Group Services and System Aspects; Security architecture and procedures for 5G system (Release 17)", 3GPP TS 33.501 v17.3.0, (Sep. 2021), 258 pages.
Zhou et al., "Tunnel Extensible Authentication Protocol (TEAP) Version 1", Internet Engineering Task Force (IETF) Request for Comments: 7170, (May 2014), 101 pages.

(Continued)

*Primary Examiner* — Gary Lafontant
(74) *Attorney, Agent, or Firm* — ALSTON & BIRD LLP

(57) ABSTRACT

Techniques for facilitating onboarding to a non-public network is provided. Provisioning parameters may be provided to User Equipment (UE) from a Default Credential Server (DCS) via a secure communication tunnel. Additionally or alternatively, provisioning parameter container(s) including readable provisioning parameters for an Onboarding Network (ONN), and secure provisioning parameters for the UE, may be transmitted to the UE via the ONN. The disclosed methods and apparatuses enable the UE to onboard to a non-public network using the provisioning parameters, and to verify the integrity of the provisioning parameters and ensure the provisioning parameters are not modified by an unauthorized device.

19 Claims, 14 Drawing Sheets

(56) References Cited

OTHER PUBLICATIONS

D. Hardt, Ed., "The OAuth 2.0 Authorization Framework", Internet Engineering Task Force (IETF) Request for Comments: 6749, (Oct. 2012), 76 pages.
International Search Report and Written Opinion for Patent Cooperation Treaty Application No. PCT/EP2022/080172 dated Mar. 30, 2023, 18 pages.
"3rd Generation Partnership Project; Technical Specification Group Services and System Aspects; Study on enhanced support of Non-Public Networks (NPN) (Release 17)", 3GPP TS 23.700 v17.0.0, (Mar. 2021), 248 pages.

* cited by examiner

CONFIGURATION OF PROVISIONING PARAMETERS FOR ONBOARDING A DEVICE TO A NETWORK

TECHNOLOGICAL FIELD

An example embodiment relates generally to wireless communications and, more particularly, but not exclusively, to configuration of provisioning parameters for onboarding devices to a network.

BACKGROUND

Fourth Generation (4G) wireless mobile telecommunications technology, also known as Long Term Evolution (LTE) technology, was designed to provide high capacity mobile multimedia with high data rates particularly for human interaction. Next generation or Fifth Generation (5G) technology is intended to be used not only for human interaction, but also for machine type communications in so-called Internet of Things (IoT) networks. Sixth Generation (6G) technology further builds off 5G technology to provide high yield increased processing speeds.

When onboarding a device such as user equipment to a network for the first time, a Default Credential Server (DCS) authenticates the device. Following authentication, provisioning parameters may be sent to the device to enable the device to connect to a Provisioning Server (PVS) and register with the network. In some instances, if the provisioning parameters are transmitted in an unsecure manner, the integrity of the provisioning parameters is unknown, and the device or device owner cannot be certain the PVS is the PVS authorized by the DCS.

BRIEF SUMMARY

A method, apparatus, and computer program product are therefore disclosed for configuring provision parameters. An apparatus is provided comprising processing circuitry and at least one memory including computer program code, the at least one memory and the computer program code configured to, with the processing circuitry, cause the apparatus to at least receive from a device, in association with an onboarding request by the device, an authentication message. In response to receiving the authentication message, the at least one memory and the computer program code are further configured to, with the processing circuitry, cause the apparatus to establish a secure communication tunnel with the device, and cause transmission of, within the secure communication tunnel, provisioning parameters comprising at least an address of a provisioning server. According to certain embodiments, the provisioning parameters further comprise a correlation identifier associated with a subscription data entity configured by the provisioning server.

According to certain embodiments the address of the provisioning server comprises at least one of a provisioning server Fully Qualified Domain Name (FQDN), Internet protocol (IP) address, or IP address range. The provisioning parameters enable Internet Protocol (IP) communication between the device and the provisioning server for provisioning of at least one of credentials or a subscription profile, to further enable network connectivity between the device and a non-public network associated with the provisioning server.

Another apparatus is provided, comprising processing circuitry and at least one memory including computer program code, the at least one memory and the computer program code configured to, with the processing circuitry, cause the apparatus to cause transmission of an authentication message to an authentication server, wherein the authentication message is associated with an onboarding request by the apparatus. The at least one memory and the computer program code are further configured to, with the processing circuitry receive, via a secure communication tunnel with the authentication server, provisioning parameters comprising at least an address of a provisioning server address.

In certain embodiments, the authentication server is a Default Credential Server (DCS). In certain embodiments, the at least one memory and the computer program code are further configured to, with the processing circuitry, cause the apparatus to cause transmission of an authentication message to an authentication server. In certain embodiments, the at least one memory and the computer program code are further configured to, with the processing circuitry, cause the apparatus to, using the provisioning parameters, establish an Internet Protocol (IP) communication session with the provisioning server. The at least one memory and the computer program code are further configured to, with the processing circuitry, cause the apparatus to receive via the IP communication session with the provisioning server, at least one of credentials or a subscription profile. The at least one memory and the computer program code are further configured to, with the processing circuitry, cause the apparatus to, using the at least one of the credentials or the subscription profile, establish network connectivity with a non-public network associated with the provisioning server.

Another apparatus is provided, comprising at least one processing circuitry and at least one memory including computer program code, the at least one memory and the computer program code configured to, with the processing circuitry, cause the apparatus to at least authenticate a device requesting onboarding to a non-public network. The at least one memory and the computer program code are further configured to, with the processing circuitry, cause the apparatus to generate at least one of (a) a partially readable provisioning parameter container comprising readable provisioning parameters and secure provisioning parameters, or (b) a readable provisioning parameter container comprising the readable provisioning parameters and a secure provisioning parameter container comprising the secure provisioning parameters, wherein the at least one of the secure provisioning parameter container or the secure provisioning parameters are secured by at least one of signing with a private key, or encrypting with a public key of the device. The at least one memory and the computer program code are further configured to, with the processing circuitry, cause the apparatus to provide a provisioning parameter indicator toward one or more network functions of an onboarding network, provide the at least one of the (a) the partially readable provisioning parameter container, or (b) the readable provisioning parameter container and the secure provisioning parameter container comprising the secure provisioning parameters to the onboarding network.

According to certain embodiments, the provisioning parameter indicator comprises at least one Uniform Resource Locator (URL) pointing to the at least one of (a) the partially readable provisioning parameter container, or (b) the readable provisioning parameter container and the secure provisioning parameter container. According to certain embodiments, providing the at least one of (a) the partially readable provisioning parameter container, or (b) the readable provisioning parameter container and the secure provisioning parameter container to the onboarding network comprises: responsive to one or more requests via the at least one URLs, by or on behalf of a Session Management Function (SMF), providing the at least one of (a) the partially readable provisioning parameter container, or (b) the readable provisioning parameter container and the secure provisioning parameter container to the SMF.

In certain embodiments, the one or more network functions toward which the provisioning parameter indicator is provided is an Access and Mobility Management Function (AMF). The provisioning parameter indicator may be provided to the AMF via an Authentication Server Function (AUSF).

The at least one memory and the computer program code are further configured to, with the processing circuitry, cause the apparatus to, during authentication, receive from an Access and Mobility Management Function (AMF), a Network Exposure Function (NEF) indication.

In certain embodiments, providing the at least one of (a) the partially readable provisioning parameter container, or (b) the readable provisioning parameter container and the secure provisioning parameter container to the onboarding network comprises providing the at least one of (a) the partially readable provisioning parameter container, or (b) the readable provisioning parameter container and the secure provisioning parameter container to the NEF.

In certain embodiments, the at least one of (a) the partially readable provisioning parameter container, or (b) the readable provisioning parameter container and the secure provisioning parameter container are provided to the onboarding network prior to the authentication of the device.

Another apparatus is provided, comprising at least one processing circuitry and at least one memory including computer program code, the at least one memory and the computer program code configured to, with the processing circuitry, cause the apparatus to at least receive, from an authentication server, at least one of (a) a partially readable provisioning parameter container comprising readable provisioning parameters and secure provisioning parameters, or (b) a readable provisioning parameter container comprising the readable provisioning parameters and a secure provisioning parameter container comprising the secure provisioning parameters, wherein the secure provisioning parameters are unreadable by the apparatus.

The at least one memory and the computer program code are further configured to, with the processing circuitry, cause the apparatus to utilize the readable provisioning parameters to restrict data sessions with devices, and provide the secure provisioning parameters to an authenticated device.

According to certain embodiments, prior to receiving the at least one of the (a) partially readable provisioning parameter container or (b) the readable provisioning parameter container and the secure provisioning parameter container, the at least one memory and the computer program code are further configured to, with the processing circuitry, cause the apparatus to receive, from the authentication server a provisioning parameter indicator comprising at least one Uniform Resource Locator (URL) pointing to the (a) partially readable provisioning parameter container or (b) the readable provisioning parameter container and the secure provisioning parameter container, on the authentication server, wherein the (a) partially readable provisioning parameter container or (b) the readable provisioning parameter container and the secure provisioning parameter container are received via access to the at least one URL. The secure provisioning parameters may be provided, within a Protocol Configuration Options (PCO) data object to the authenticated device via a Packet Data Unit (PDU) session.

The provisioning parameter indicator may be received by an Access and Mobility Management Function (AMF) and provided to a Session Management Function (SMF). The PDU session may be established with a Session Management Function (SMF). The provisioning parameter indicator is received from the authentication server via an Authentication Server Function (AUSF).

In certain embodiments, prior to receiving the at least one of the (a) partially readable provisioning parameter container or (b) the readable provisioning parameter container and the secure provisioning parameter container, the at least one memory and the computer program code are further configured to, with the processing circuitry, cause the apparatus to at least provide a Network Exposure Function (NEF) indication to the authentication server, wherein the NEF indication identifies an NEF of the onboarding network, and wherein the authentication server provides the at least one of the (a) partially readable provisioning parameter container or (b) the readable provisioning parameter container and the secure provisioning parameter container to the NEF via a NEF API. In certain embodiments, the at least one memory and the computer program code are further configured to, with the processing circuitry, prior to providing the secure provisioning parameters to the authenticated device, cause storing by an access and Mobility Management Function (AMF) of the onboarding network, a provisioning parameter indicator and metadata received from the authentication serve. The at least one memory and the computer program code are further configured to, with the processing circuitry, store the at least one of the (a) partially readable provisioning parameter container or (b) the readable provisioning parameter container and the secure provisioning parameter container, by the NEF on a Unified Data Repository (UDR), and by the UDR, notifying a Policy Control Function (PCF) of the onboarding network. The at least one memory and the computer program code are further configured to, with the processing circuitry, establish a data session with the authenticated device and provide the provisioning parameter indicator from the AMF to a Session Management Function (SMF). The at least one memory and the computer program code are further configured to, with the processing circuitry, retrieve, by the SMF, and from the PCF, policy rules comprising the at least one of the (a) partially readable provisioning parameter container or (b) the readable provisioning parameter container and the secure provisioning parameter container, wherein the secure provisioning parameters and the PCO is provided to the authenticated device by the SMF.

Another apparatus is provided, including at least one processing circuitry and at least one memory including computer program code, the at least one memory and the computer program code configured to, with the processing circuitry, cause the apparatus to at least perform onboarding registration and authentication with an authentication server. The memory and the computer program code are further configured to, with the processing circuitry, cause the apparatus to establish a data session with an onboarding network associated with the authentication server. The at least one memory and the computer program code are further configured to, with the processing circuitry, cause the apparatus to receive, via the data session, a provisioning parameter container. The at least one memory and the computer program code are further configured to, with the processing circuitry, cause the apparatus to access at least secure provisioning parameters in a data object by performing at least one of decryption with a private key, or signature verification with a public key of the authentication server, of the provisioning parameter container or a portion thereof, wherein the secure provisioning parameters enable network connectivity with a non-public network. The secure provisioning parameters are associated with the non-public network and comprise at least one of a Provisioning Server (PVS) Internet Protocol (IP) address, PVS Fully Qualified Domain Name (FQDN), IP address range, or PVS domain. The data session may be a Packet Data Unit (PDU) session, and the data object may be a Protocol Configuration Options (PCO) data object.

A method is provided, including receiving from a device, in association with an onboarding request by the device, an authentication message. The method further includes establishing a secure communication tunnel with the device, and causing transmission of, within the secure communication tunnel, provisioning parameters comprising at least an address of a provisioning server. According to certain embodiments, the provisioning parameters further comprise a correlation identifier associated with a subscription data entity configured by the provisioning server.

Another method is provided, including causing transmission of an authentication message to an authentication server, wherein the authentication message is associated with an onboarding request. The method further includes receiving, via a secure communication tunnel with the authentication server, provisioning parameters comprising at least an address of a provisioning server address.

In certain embodiments, the authentication server is a Default Credential Server (DCS). In certain embodiments, the method includes causing transmission of an authentication message to an authentication server. In certain embodiments, the method includes, using the provisioning parameters, establishing an Internet Protocol (IP) communication session with the provisioning server. The method further includes receiving via the IP communication session with the provisioning server, at least one of credentials or a subscription profile. The method further includes, using the at least one of the credentials or the subscription profile, establishing network connectivity with a non-public network associated with the provisioning server.

Another method is provided, including authenticating a device requesting onboarding to a non-public network. The method further includes generating at least one of (a) a partially readable provisioning parameter container comprising readable provisioning parameters and secure provisioning parameters, or (b) a readable provisioning parameter container comprising the readable provisioning parameters and a secure provisioning parameter container comprising the secure provisioning parameters, wherein the at least one of the secure provisioning parameter container or the secure provisioning parameters are secured by at least one of signing with a private key, or encrypting with a public key of the device. The method further includes providing a provisioning parameter indicator toward one or more network functions of an onboarding network, provide the at least one of the (a) the partially readable provisioning parameter container, or (b) the readable provisioning parameter container and the secure provisioning parameter container comprising the secure provisioning parameters to the onboarding network.

The provisioning parameter indicator comprises at least one Uniform Resource Locator (URL) pointing to the at least one of (a) the partially readable provisioning parameter container, or (b) the readable provisioning parameter container and the secure provisioning parameter container. According to certain embodiments, providing the at least one of (a) the partially readable provisioning parameter container, or (b) the readable provisioning parameter container and the secure provisioning parameter container to the onboarding network comprises: responsive to one or more requests via the at least one URLs, by or on behalf of a Session Management Function (SMF), providing the at least one of (a) the partially readable provisioning parameter container, or (b) the readable provisioning parameter container and the secure provisioning parameter container to the SMF.

The method further includes, during authentication, receiving from an Access and Mobility Management Function (AMF), a Network Exposure Function (NEF) indication.

The method further includes, providing the at least one of (a) the partially readable provisioning parameter container, or (b) the readable provisioning parameter container and the secure provisioning parameter container to the onboarding network comprises providing the at least one of (a) the partially readable provisioning parameter container, or (b) the readable provisioning parameter container and the secure provisioning parameter container to the NEF.

In certain embodiments, the at least one of (a) the partially readable provisioning parameter container, or (b) the readable provisioning parameter container and the secure provisioning parameter container are provided to the onboarding network prior to the authentication of the device.

Another method is provided, including receiving, from an authentication server, at least one of (a) a partially readable provisioning parameter container comprising readable provisioning parameters and secure provisioning parameters, or (b) a readable provisioning parameter container comprising the readable provisioning parameters and a secure provisioning parameter container comprising the secure provisioning parameters, wherein the secure provisioning parameters are unreadable by a recipient.

The method may further include utilizing the readable provisioning parameters to restrict data sessions with devices, and providing the secure provisioning parameters to an authenticated device.

According to certain embodiments, prior to receiving the at least one of the (a) partially readable provisioning parameter container or (b) the readable provisioning parameter container and the secure provisioning parameter container, the method further includes receiving, from the authentication server a provisioning parameter indicator comprising at least one Uniform Resource Locator (URL) pointing to the (a) partially readable provisioning parameter container or (b) the readable provisioning parameter container and the secure provisioning parameter container, on the authentication server, wherein the (a) partially readable provisioning parameter container or (b) the readable provisioning parameter container and the secure provisioning parameter container are received via access to the at least one URL.

The secure provisioning parameters may be provided, within a Protocol Configuration Options (PCO) data object to the authenticated device via a Packet Data Unit (PDU) session.

The provisioning parameter indicator may be received by an Access and Mobility Management Function (AMF) and provided to a Session Management Function (SMF). The PDU session may be established with a Session Management Function (SMF). The provisioning parameter indicator is received from the authentication server via an Authentication Server Function (AUSF).

In certain embodiments, prior to receiving the at least one of the (a) partially readable provisioning parameter container or (b) the readable provisioning parameter container and the secure provisioning parameter container, the method further includes providing a Network Exposure Function (NEF) indication to the authentication server, wherein the NEF indication identifies an NEF of the onboarding network, and wherein the authentication server provides the at least one of the (a) partially readable provisioning parameter container or (b) the readable provisioning parameter container and the secure provisioning parameter container to the NEF via a NEF API. In certain embodiments, the method further includes providing the secure provisioning parameters to the authenticated device, cause storing by an access and Mobility Management Function (AMF) of the onboarding network, a provisioning parameter indicator and metadata received from the authentication serve. The method further includes storing the at least one of the (a) partially readable provisioning parameter container or (b) the readable provisioning parameter container and the secure provisioning parameter container, by the NEF on a Unified Data Repository (UDR), and by the UDR, notifying a Policy Control Function (PCF) of the onboarding network. The method further includes, establishing a data session with the authenticated device and provide the provisioning parameter indicator from the AMF to a Session Management Function (SMF). The method further includes retrieving, by the SMF, and from the PCF, policy rules comprising the at least one of the (a) partially readable provisioning parameter container or (b) the readable provisioning parameter container and the secure provisioning parameter container, wherein the secure provisioning parameters and the PCO is provided to the authenticated device by the SMF.

The method further includes performing onboarding registration and authentication with an authentication server. The method further includes establishing a data session with an onboarding network associated with the authentication server. The method includes receiving, via the data session, a provisioning parameter container. The method may further include accessing at least secure provisioning parameters in a data object by performing at least one of decryption with a private key, or signature verification with a public key of the authentication server, of the provisioning parameter container or a portion thereof, wherein the secure provisioning parameters enable network connectivity with a non-public network. The secure provisioning parameters are associated with the non-public network and comprise at least one of a Provisioning Server (PVS) Internet Protocol (IP) address, PVS Fully Qualified Domain Name (FQDN), IP address range, or PVS domain. The data session may be a Packet Data Unit (PDU) session, and the data object may be a Protocol Configuration Options (PCO) data object.

A computer program product comprising at least one non-transitory computer-readable storage medium having computer-executable program code instructions stored therein, the computer-executable program code instructions comprising program code instructions to receive from a device, in association with an onboarding request by the device, an authentication message. In response to receiving the authentication message, the computer-executable program code instructions further program code instructions to establish a secure communication tunnel with the device, and cause transmission of, within the secure communication tunnel, provisioning parameters comprising at least an address of a provisioning server. According to certain embodiments, the provisioning parameters further comprise a correlation identifier associated with a subscription data entity configured by the provisioning server.

Another computer program product is provided, comprising at least one non-transitory computer-readable storage medium having computer-executable program code instructions stored therein, the computer-executable program code instructions comprising program code instructions to cause transmission of an authentication message to an authentication server, wherein the authentication message is associated with an onboarding request. The computer-executable program code further includes program code instructions to receive, via a secure communication tunnel with the authentication server, provisioning parameters comprising at least an address of a provisioning server address.

In certain embodiments, the authentication server is a Default Credential Server (DCS). The computer-executable program code further includes program code instructions to cause transmission of an authentication message to an authentication server. The computer-executable program code further includes program code instructions to, using the provisioning parameters, establish an Internet Protocol (IP) communication session with the provisioning server. The computer-executable program code further includes program code instructions to, with the processing circuitry, receive via the IP communication session with the provisioning server, at least one of credentials or a subscription profile. The computer-executable program code further includes program code instructions to use the at least one of the credentials or the subscription profile, establish network connectivity with a non-public network associated with the provisioning server.

The computer-executable program code further includes program code instructions to authenticate a device requesting onboarding to a non-public network. The computer-executable program code further includes program code instructions to generate at least one of (a) a partially readable provisioning parameter container comprising readable provisioning parameters and secure provisioning parameters, or (b) a readable provisioning parameter container comprising the readable provisioning parameters and a secure provisioning parameter container comprising the secure provisioning parameters, wherein the at least one of the secure provisioning parameter container or the secure provisioning parameters are secured by at least one of signing with a private key, or encrypting with a public key of the device. The computer-executable program code further includes program code instructions to provide a provisioning parameter indicator toward one or more network functions of an onboarding network, provide the at least one of the (a) the partially readable provisioning parameter container, or (b) the readable provisioning parameter container and the secure provisioning parameter container comprising the secure provisioning parameters to the onboarding network.

According to certain embodiments, the provisioning parameter indicator comprises at least one Uniform Resource Locator (URL) pointing to the at least one of (a) the partially readable provisioning parameter container, or (b) the readable provisioning parameter container and the secure provisioning parameter container. According to certain embodiments, providing the at least one of (a) the partially readable provisioning parameter container, or (b) the readable provisioning parameter container and the secure provisioning parameter container to the onboarding network comprises: responsive to one or more requests via the at least one URLs, by or on behalf of a Session Management Function (SMF), providing the at least one of (a) the partially readable provisioning parameter container, or (b) the readable provisioning parameter container and the secure provisioning parameter container to the SMF.

In certain embodiments, the one or more network functions toward which the provisioning parameter indicator is provided is an Access and Mobility Management Function (AMF). The provisioning parameter indicator may be provided to the AMF via an Authentication Server Function (AUSF).

The computer-executable program code further includes program code instructions to, during authentication, receive from an Access and Mobility Management Function (AMF), a Network Exposure Function (NEF) indication.

In certain embodiments, providing the at least one of (a) the partially readable provisioning parameter container, or (b) the readable provisioning parameter container and the secure provisioning parameter container to the onboarding network comprises providing the at least one of (a) the partially readable provisioning parameter container, or (b) the readable provisioning parameter container and the secure provisioning parameter container to the NEF.

In certain embodiments, the at least one of (a) the partially readable provisioning parameter container, or (b) the readable provisioning parameter container and the secure provisioning parameter container are provided to the onboarding network prior to the authentication of the device.

Another computer program product is provided, comprising at least one non-transitory computer-readable storage medium having computer-executable program code instructions stored therein, the computer-executable program code instructions comprising program code instructions to receive, from an authentication server, at least one of (a) a partially readable provisioning parameter container comprising readable provisioning parameters and secure provisioning parameters, or (b) a readable provisioning parameter container comprising the readable provisioning parameters and a secure provisioning parameter container comprising the secure provisioning parameters, wherein the secure provisioning parameters are unreadable by the apparatus.

The computer-executable program code further includes program code instructions to, utilize the readable provisioning parameters to restrict data sessions with devices, and provide the secure provisioning parameters to an authenticated device.

According to certain embodiments, prior to receiving the at least one of the (a) partially readable provisioning parameter container or (b) the readable provisioning parameter container and the secure provisioning parameter container, the computer-executable program code further includes program code instructions to receive, from the authentication server a provisioning parameter indicator comprising at least one Uniform Resource Locator (URL) pointing to the (a) partially readable provisioning parameter container or (b) the readable provisioning parameter container and the secure provisioning parameter container, on the authentication server, wherein the (a) partially readable provisioning parameter container or (b) the readable provisioning parameter container and the secure provisioning parameter container are received via access to the at least one URL.

The secure provisioning parameters may be provided, within a Protocol Configuration Options (PCO) data object to the authenticated device via a Packet Data Unit (PDU) session.

The provisioning parameter indicator may be received by an Access and Mobility Management Function (AMF) and provided to a Session Management Function (SMF). The PDU session may be established with a Session Management Function (SMF). The provisioning parameter indicator is received from the authentication server via an Authentication Server Function (AUSF).

In certain embodiments, prior to receiving the at least one of the (a) partially readable provisioning parameter container or (b) the readable provisioning parameter container and the secure provisioning parameter container, the computer-executable program code further includes program code instructions to provide a Network Exposure Function (NEF) indication to the authentication server, wherein the NEF indication identifies an NEF of the onboarding network, and wherein the authentication server provides the at least one of the (a) partially readable provisioning parameter container or (b) the readable provisioning parameter container and the secure provisioning parameter container to the NEF via a NEF API. In certain embodiments, the computer-executable program code further includes program code instructions to, prior to providing the secure provisioning parameters to the authenticated device, cause storing by an access and Mobility Management Function (AMF) of the onboarding network, a provisioning parameter indicator and metadata received from the authentication serve. The computer-executable program code further includes program code instructions to store the at least one of the (a) partially readable provisioning parameter container or (b) the readable provisioning parameter container and the secure provisioning parameter container, by the NEF on a Unified Data Repository (UDR), and by the UDR, notifying a Policy Control Function (PCF) of the onboarding network. The computer-executable program code further includes program code instructions to, establish a data session with the authenticated device and provide the provisioning parameter indicator from the AMF to a Session Management Function (SMF). The computer-executable program code further includes program code instructions to, retrieve, by the SMF, and from the PCF, policy rules comprising the at least one of the (a) partially readable provisioning parameter container or (b) the readable provisioning parameter container and the secure provisioning parameter container, wherein the secure provisioning parameters and the PCO is provided to the authenticated device by the SMF.

Another computer program product is provided, comprising at least one non-transitory computer-readable storage medium having computer-executable program code instructions stored therein, the computer-executable program code instructions comprising program code instructions to perform onboarding registration and authentication with an authentication server. The computer-executable program code instructions further program code instructions to establish a data session with an onboarding network associated with the authentication server. The computer-executable program code instructions further program code instructions to receive, via the data session, a provisioning parameter container. The computer-executable program code instructions further program code instructions to access at least secure provisioning parameters in a data object by performing at least one of decryption with a private key, or signature verification with a public key of the authentication server, of the provisioning parameter container or a portion thereof, wherein the secure provisioning parameters enable network connectivity with a non-public network. The secure provisioning parameters are associated with the non-public network and comprise at least one of a Provisioning Server (PVS) Internet Protocol (IP) address, PVS Fully Qualified Domain Name (FQDN), IP address range, or PVS domain. The data session may be a Packet Data Unit (PDU) session, and the data object may be a Protocol Configuration Options (PCO) data object.

An apparatus is provided, including means for receiving from a device, in association with an onboarding request by the device, an authentication message. The apparatus further includes means for establishing a secure communication tunnel with the device, and causing transmission of, within the secure communication tunnel, provisioning parameters comprising at least an address of a provisioning server. According to certain embodiments, the provisioning parameters further comprise a correlation identifier associated with a subscription data entity configured by the provisioning server.

Another apparatus is provided, including means for causing transmission of an authentication message to an authentication server, wherein the authentication message is associated with an onboarding request. The apparatus further includes means for receiving, via a secure communication tunnel with the authentication server, provisioning parameters comprising at least an address of a provisioning server address.

In certain embodiments, the authentication server is a Default Credential Server (DCS). In certain embodiments, the apparatus includes means for causing transmission of an authentication message to an authentication server. In certain embodiments, the apparatus includes means for, using the provisioning parameters, establishing an Internet Protocol (IP) communication session with the provisioning server. The apparatus further includes means for receiving via the IP communication session with the provisioning server, at least one of credentials or a subscription profile. The apparatus further includes means for, using the at least one of the credentials or the subscription profile, establishing network connectivity with a non-public network associated with the provisioning server.

Another apparatus is provided, including means for authenticating a device requesting onboarding to a non-public network. The apparatus further includes means for generating at least one of (a) a partially readable provisioning parameter container comprising readable provisioning parameters and secure provisioning parameters, or (b) a readable provisioning parameter container comprising the readable provisioning parameters and a secure provisioning parameter container comprising the secure provisioning parameters, wherein the at least one of the secure provisioning parameter container or the secure provisioning parameters are secured by at least one of signing with a private key, or encrypting with a public key of the device. The apparatus further includes means for providing a provisioning parameter indicator toward one or more network functions of an onboarding network, and means for providing the at least one of the (a) the partially readable provisioning parameter container, or (b) the readable provisioning parameter container and the secure provisioning parameter container comprising the secure provisioning parameters to the onboarding network.

The apparatus further includes means for, during authentication, receiving from an Access and Mobility Management Function (AMF), a Network Exposure Function (NEF) indication.

The apparatus further includes means for, providing the at least one of (a) the partially readable provisioning parameter container, or (b) the readable provisioning parameter container and the secure provisioning parameter container to the onboarding network comprises providing the at least one of (a) the partially readable provisioning parameter container, or (b) the readable provisioning parameter container and the secure provisioning parameter container to the NEF.

In certain embodiments, the at least one of (a) the partially readable provisioning parameter container, or (b) the readable provisioning parameter container and the secure provisioning parameter container are provided to the onboarding network prior to the authentication of the device.

Another apparatus is provided, including means for receiving, from an authentication server, at least one of (a) a partially readable provisioning parameter container comprising readable provisioning parameters and secure provisioning parameters, or (b) a readable provisioning parameter container comprising the readable provisioning parameters and a secure provisioning parameter container comprising the secure provisioning parameters, wherein the secure provisioning parameters are unreadable by a recipient.

The apparatus may further include means for utilizing the readable provisioning parameters to restrict data sessions with devices, and providing the secure provisioning parameters to an authenticated device.

According to certain embodiments, prior to receiving the at least one of the (a) partially readable provisioning parameter container or (b) the readable provisioning parameter container and the secure provisioning parameter container, the apparatus further includes means for receiving, from the authentication server a provisioning parameter indicator comprising at least one Uniform Resource Locator (URL) pointing to the (a) partially readable provisioning parameter container or (b) the readable provisioning parameter container and the secure provisioning parameter container, on the authentication server, wherein the (a) partially readable provisioning parameter container or (b) the readable provisioning parameter container and the secure provisioning parameter container are received via access to the at least one URL.

The secure provisioning parameters may be provided, within a Protocol Configuration Options (PCO) data object to the authenticated device via a Packet Data Unit (PDU) session.

The provisioning parameter indicator may be received by an Access and Mobility Management Function (AMF) and provided to a Session Management Function (SMF). The PDU session may be established with a Session Management Function (SMF). The provisioning parameter indicator is received from the authentication server via an Authentication Server Function (AUSF).

In certain embodiments, prior to receiving the at least one of the (a) partially readable provisioning parameter container or (b) the readable provisioning parameter container and the secure provisioning parameter container, the apparatus further includes means for providing a Network Exposure Function (NEF) indication to the authentication server, wherein the NEF indication identifies an NEF of the onboarding network, and wherein the authentication server provides the at least one of the (a) partially readable provisioning parameter container or (b) the readable provisioning parameter container and the secure provisioning parameter container to the NEF via a NEF API. In certain embodiments, the apparatus further includes means for providing the secure provisioning parameters to the authenticated device, cause storing by an access and Mobility Management Function (AMF) of the onboarding network, a provisioning parameter indicator and metadata received from the authentication serve. The apparatus further includes means for storing the at least one of the (a) partially readable provisioning parameter container or (b) the readable provisioning parameter container and the secure provisioning parameter container, by the NEF on a Unified Data Repository (UDR), and by the UDR, notifying a Policy Control Function (PCF) of the onboarding network. The apparatus further includes means for, establishing a data session with the authenticated device and provide the provisioning parameter indicator from the AMF to a Session Management Function (SMF). The apparatus further includes means for retrieving, by the SMF, and from the PCF, policy rules comprising the at least one of the (a) partially readable provisioning parameter container or (b) the readable provisioning parameter container and the secure provisioning parameter container, wherein the secure provisioning parameters and the PCO is provided to the authenticated device by the SMF.

The apparatus further includes means for performing onboarding registration and authentication with an authentication server. The apparatus further includes means for establishing a data session with an onboarding network associated with the authentication server. The apparatus includes means for receiving, via the data session, a provisioning parameter container. The apparatus may further include means for accessing at least secure provisioning parameters in a data object by performing at least one of decryption with a private key, or signature verification with a public key of the authentication server, of the provisioning parameter container or a portion thereof, wherein the secure provisioning parameters enable network connectivity with a non-public network. The secure provisioning parameters are associated with the non-public network and comprise at least one of a Provisioning Server (PVS) Internet Protocol (IP) address, PVS Fully Qualified Domain Name (FQDN), IP address range, or PVS domain. The data session may be a Packet Data Unit (PDU) session, and the data object may be a Protocol Configuration Options (PCO) data object.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those here summarized.

BRIEF DESCRIPTION OF THE DRAWINGS

Figure 1:
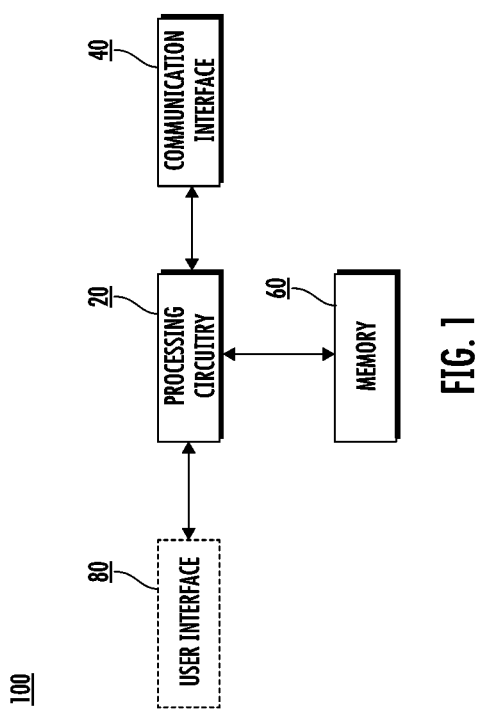
Figure 2:
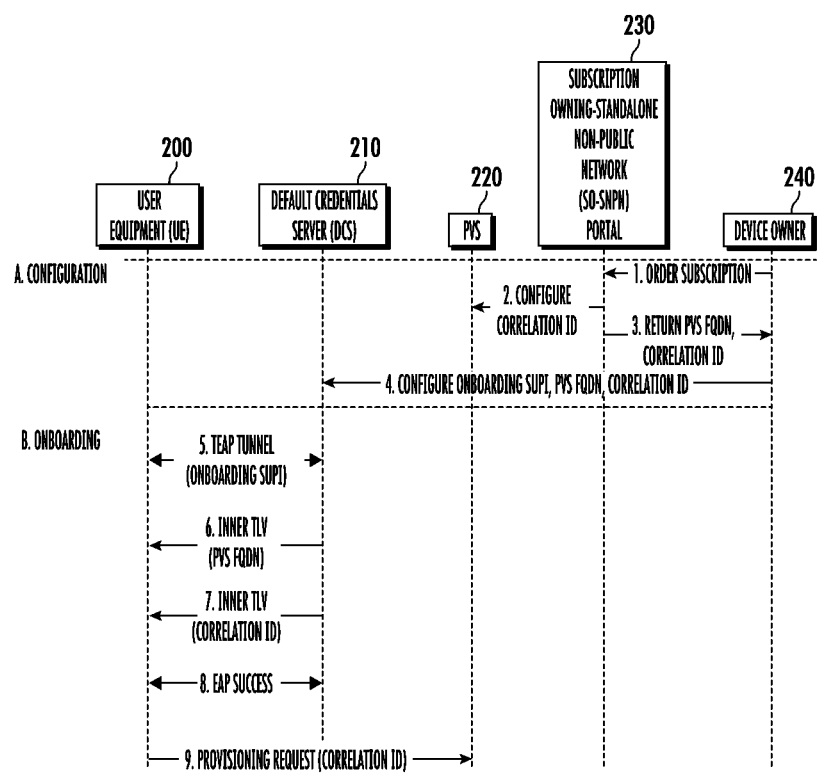
Figure 3:
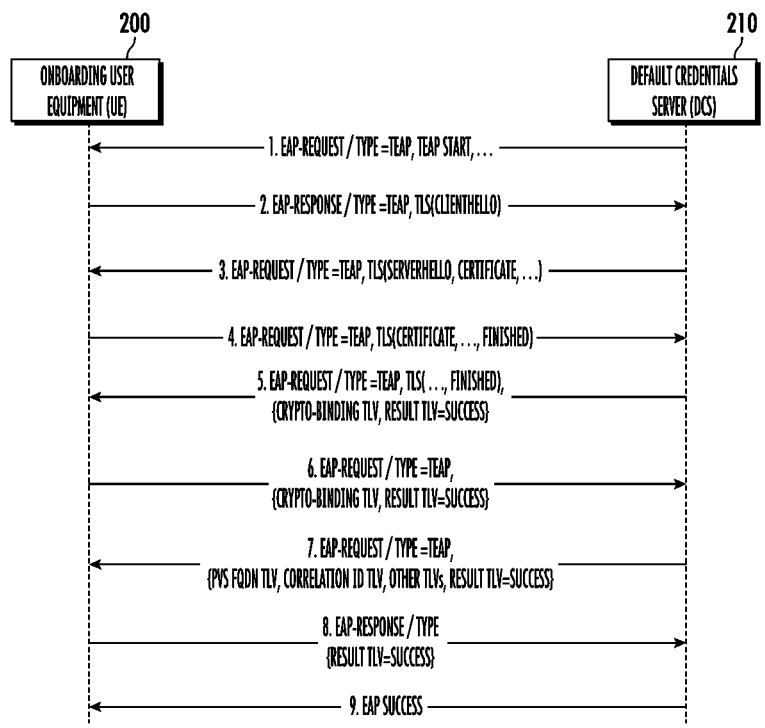
Figure 4:
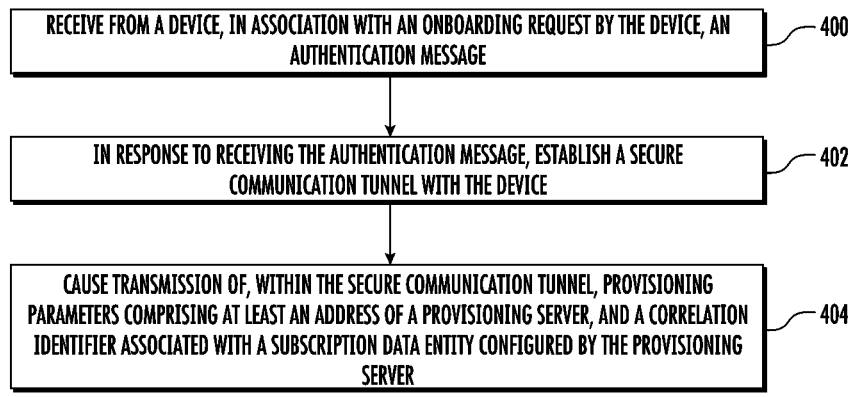
Figure 5:
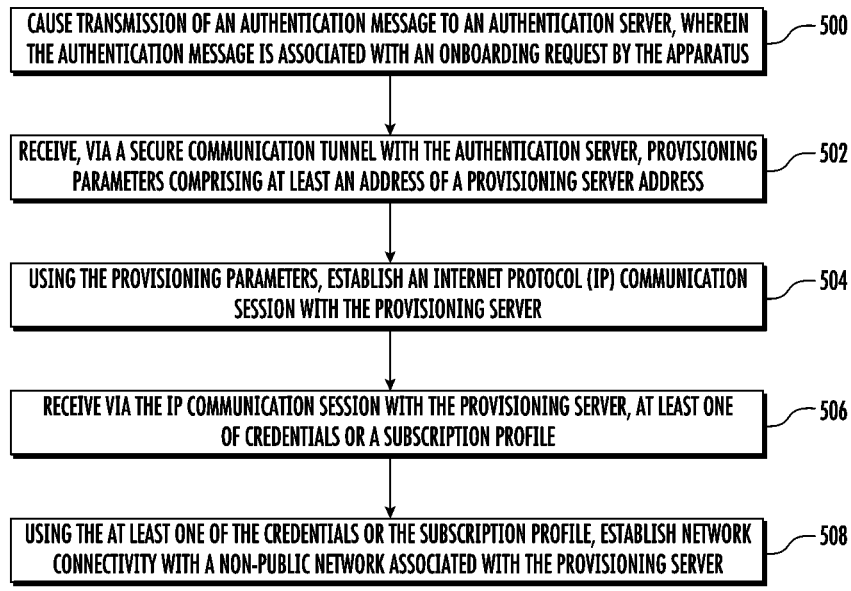
Figure 6:
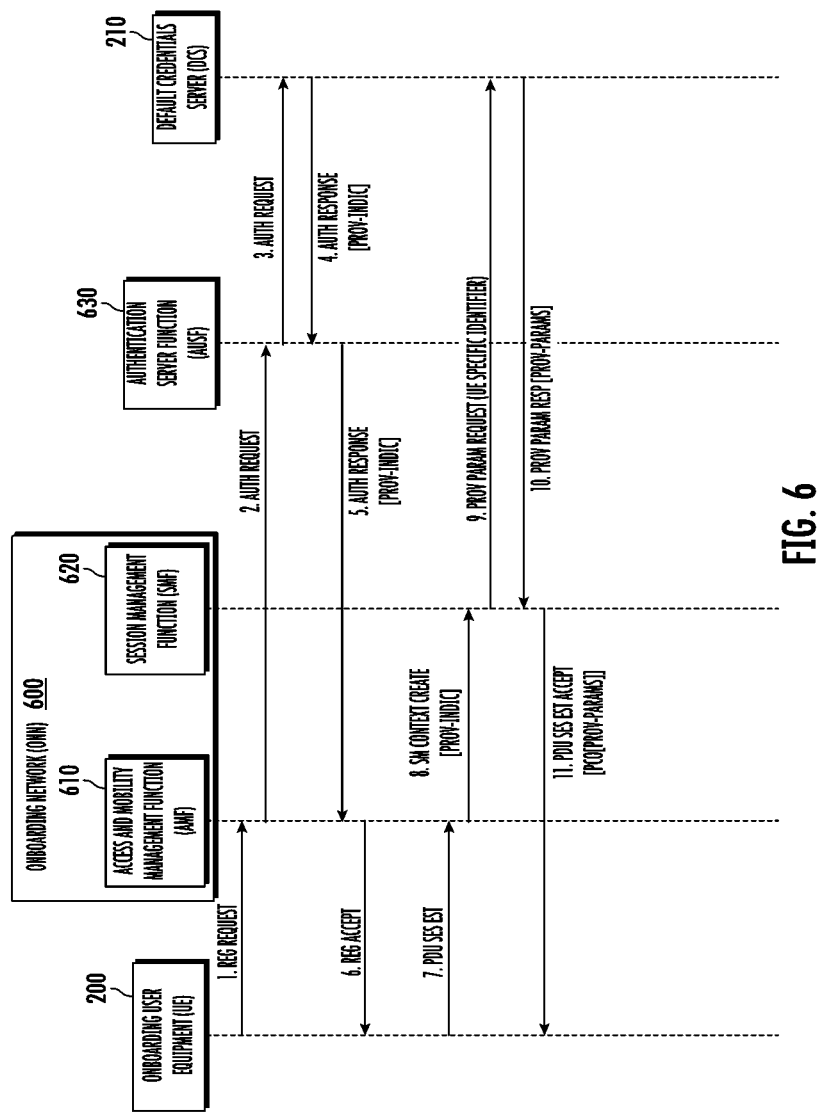
Figure 7:
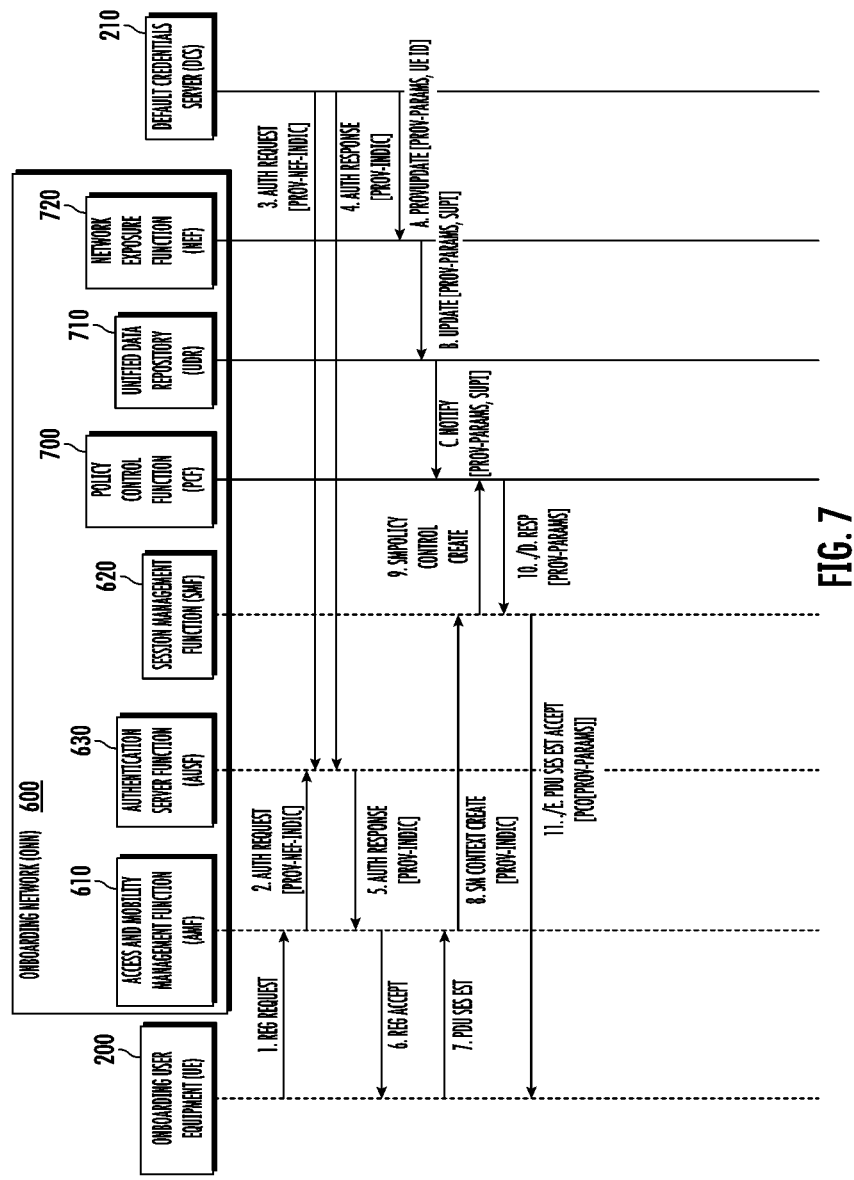
Figure 8:
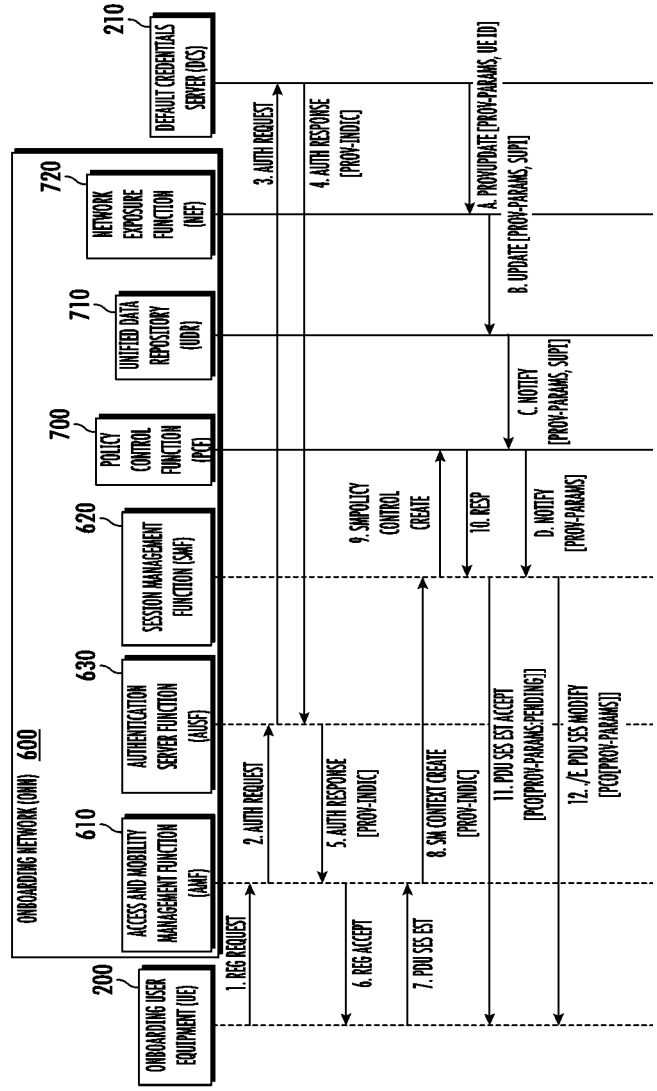
Figure 9A:
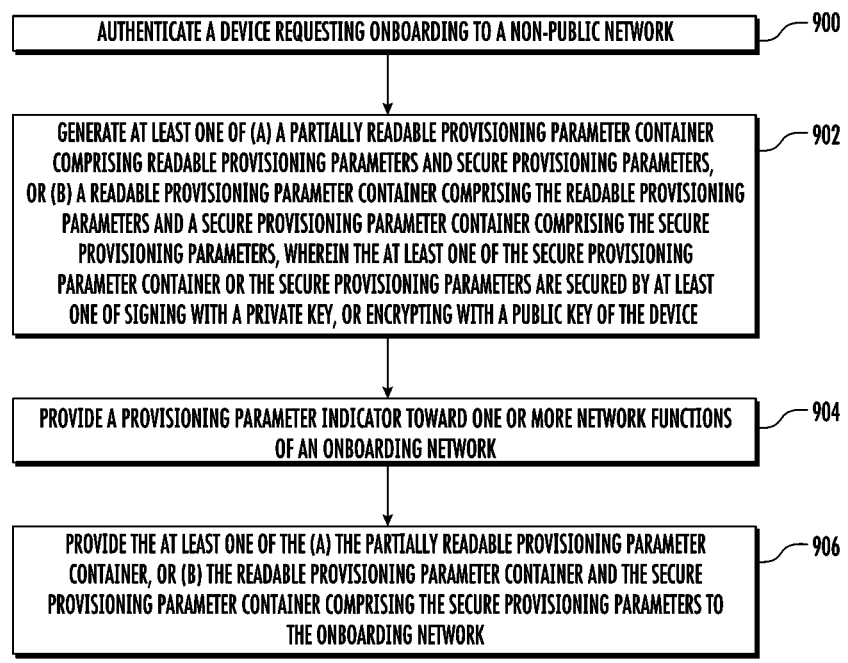
Figure 9B:
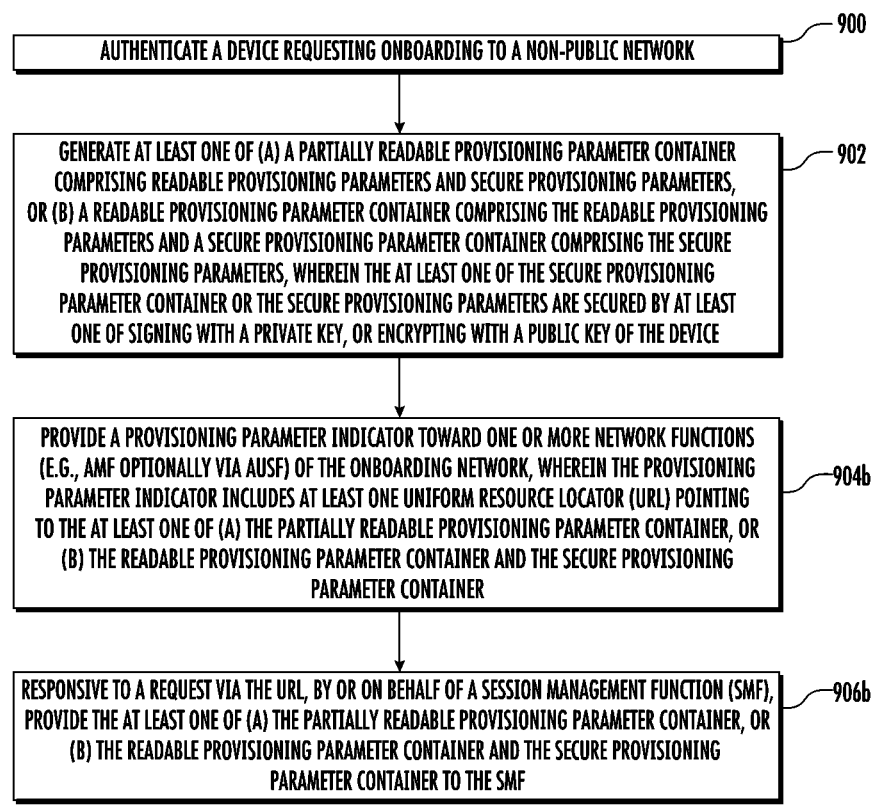
Figure 9C:
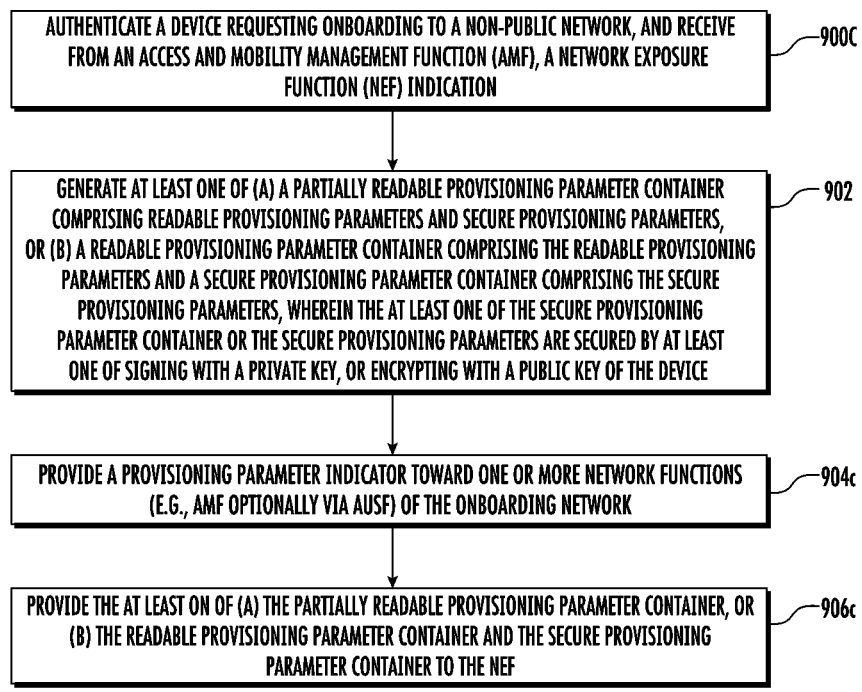
Figure 10A:
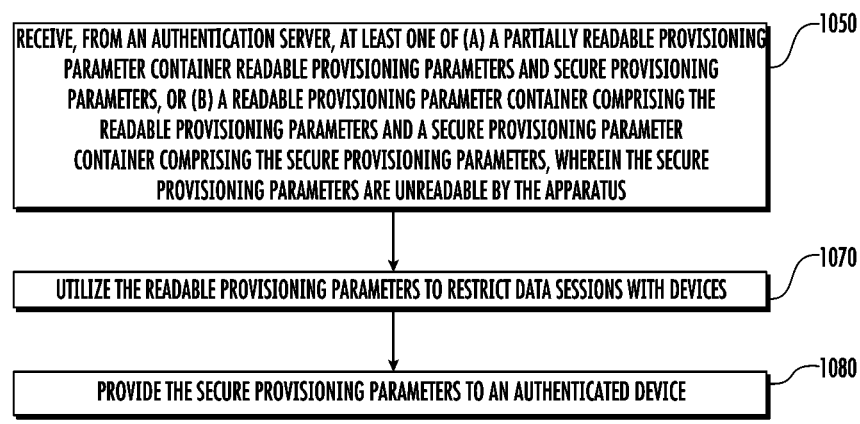
Figure 10B:
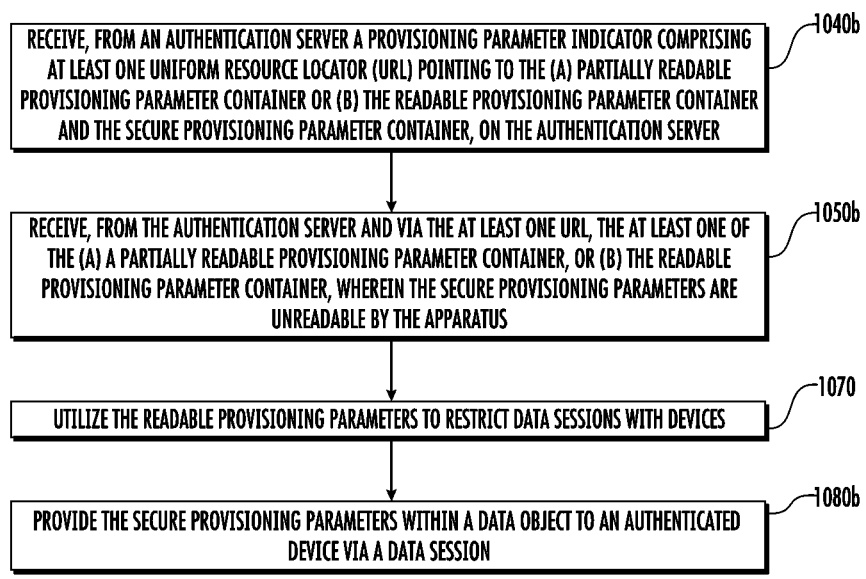
Figure 10C:
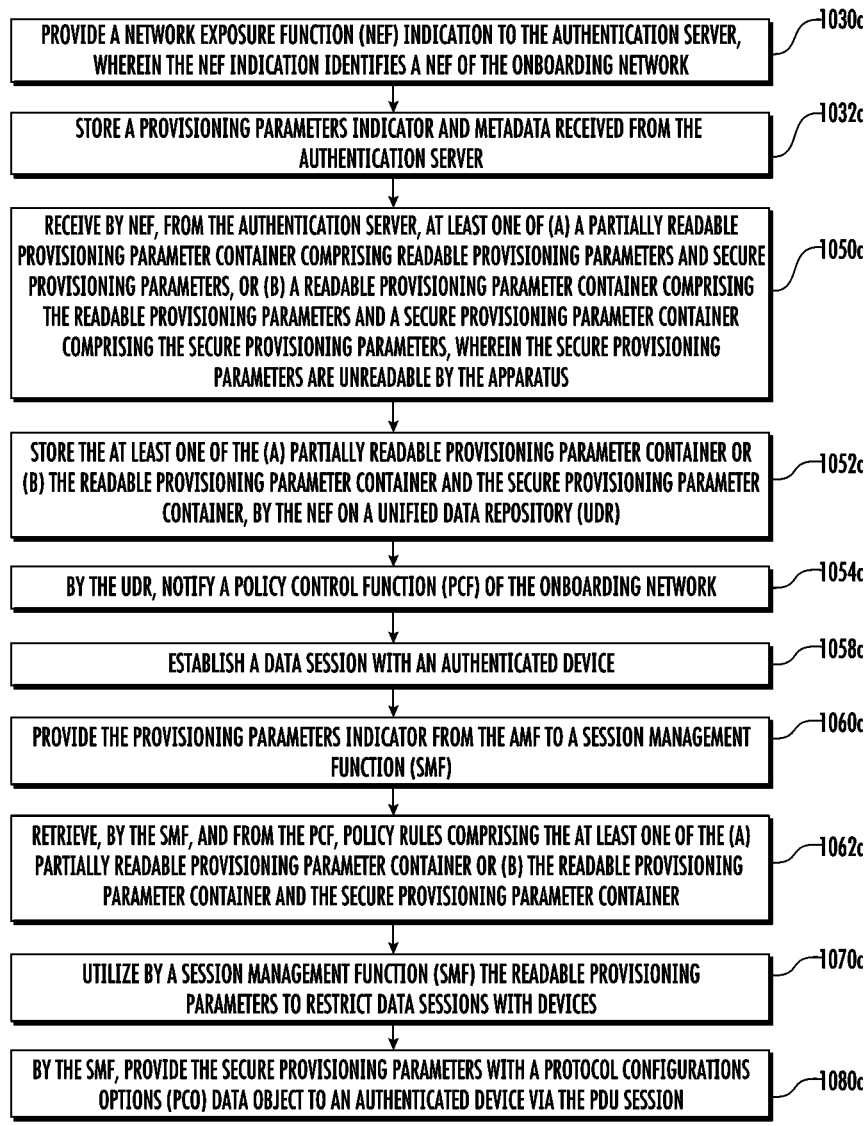
Figure 11:
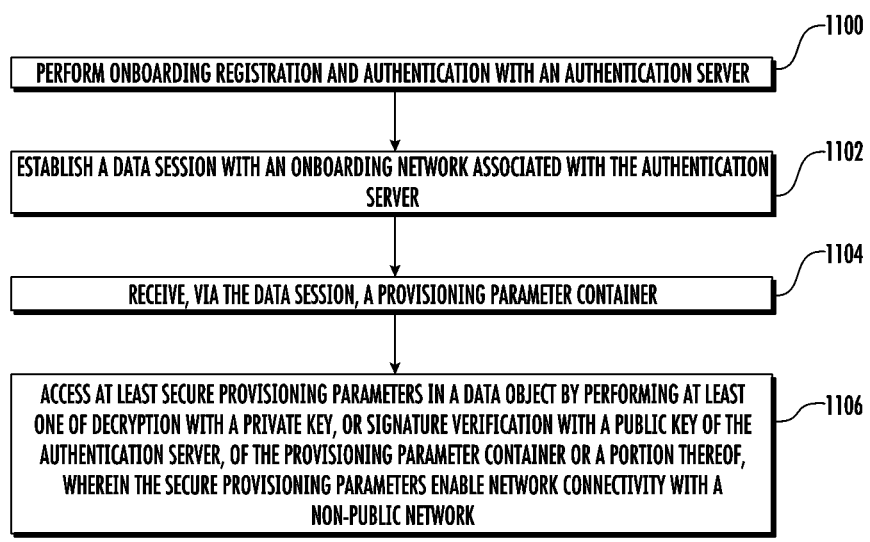

Having thus described certain example embodiments of the present disclosure in general terms, reference will hereinafter be made to the accompanying drawings, which are not necessarily drawn to scale, and wherein:

FIG. 1 is a block diagram of an apparatus that may be specifically configured in accordance with certain example embodiments;

FIG. 2 is a flowcharts of operations to transmit data amongst User Equipment (UE), a Default Credential Server (DCS), and a Provisioning Server (PVS), to facilitate UE onboarding according to certain example embodiments;

FIG. 3 is a flowchart of operations for transmitting data between a UE and DCS to facilitate UE onboarding according to certain example embodiments;

FIG. 4 is a flowchart of operations that may be performed by a Default Credential Server (DCS) to facilitate UE onboarding according to certain example embodiments;

FIG. 5 is a flowchart of operations that may be performed by a UE to facilitate onboarding to a network, according to certain example embodiments;

FIGS. 6-8 are flowcharts of operations to transmit data between a UE and DCS via an Onboarding Network (ONN) and/or network functions thereof to facilitate UE onboarding, according to certain example embodiments;

FIGS. 9A-C are flowcharts of operations that may be performed by a Default Credential Server (DCS) to facilitate UE onboarding according to certain example embodiments;

FIGS. 10A-C are flowcharts of operations that may be performed by an ONN and/or network functions thereof, to facilitate UE onboarding according to certain example embodiments; and FIG. 11 is a flowchart of operations that may be performed by User Equipment (UE) to facilitate onboarding to a network according to certain example embodiments.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device. The evolution of new communication technologies such as Fifth Generation (5G) and Sixth Generation (6G) have improved upon existing technologies such as second generation (2G) technologies, Third Generation (3G) technologies, Fourth Generation (4G) technologies and Long Term Evolution (LTE) technologies and has thus resulted in improved network connectivity. In order to accommodate diverse use cases within such communication networks, a Standalone Non-Public Network (SNPN) may enable the deployment of the communication networks, such as a 5G System (5GS), for private use for a particular facility, institution, computing entity grouping and/or the like. A particular SNPN may be identified by a combination of a Public Land Mobile Network (PLMN) identifier and a Network Identifier (NID). An SNPN may act as an Onboarding Network (ONN) allowing a user device, also referenced as User Equipment (UE), to access that SNPN based on default credentials pre-configured on the UE for the purpose of remote provision of the UE with a Subscription Owning SNPN (SO-SNPN) credentials and subscription data to enable regular access for the UE to the SO-SNPN.

Typically, a UE will establish a Packet Data Unit (PDU) session in the ONN to access a Provisioning Server (PVS). The PVS may provide SO-SNPN credentials and subscription data to the UE. Once remote-provisioned with SO-SNPN credentials, the UE may need to select or re-select and register, or re-register with a desired SNPN. The Onboarding SNPN (ON-SNPN) may or may not be the same SNPN as the SNPN providing onboarding access and enabling remote provisioning of the UE registered for onboarding.

A Default Credentials Server (DCS) may perform a primary UE authentication, such as an Extensible Authentication Protocol (EAP)-based authentication, based on the default UE credentials provided during a UE onboarding procedure with an ON-SNPN. The ON-SNPN may determine the corresponding DCS identity, address, and/or domain based on the device identifier, provided by the UE during onboarding, such as the subscription permanent identifier (SUPI), and/or the like. The DCS may provide the UE and/or ONN provisioning parameters, such as a PVS Fully Qualified Domain Name (FQDN), Internet Protocol (IP) address of the PVS, and/or the like, for enabling the UE to connect to the PVS.

The onboarding registered UE requests a PDU session from an ONN to access the PVS. The ONN provides a restricted PDU session for the remote provisioning of the UE via a user plane. A restricted PDU session allows the UE to only access the PVS providing the subscription data of the SO-SNPN such that the UE is not allowed to connect to other destinations outside or external to the PVS. The accessible PVS may be specific to an onboarding UE and dynamically provided to the ONN as part of the UE primary authentication. The onboarding UE therefore receives SO-SNPN subscriber profile data from the PVS, can deregister from the onboarding network, and utilizes the subscription received from the PVS to register with the SO-SNPN or another network that allows registrations with SO-SNPN subscription.

During the onboarding process, the UE can receive provisioning parameters like PVS address by the DCS, but if the provisioning parameters are provided in an unsecure way, the UE may be unable to confirm the PVS and/or associated SO-SNPN are authorized by the DCS.

Some methods for onboarding a UE include entry of parameters via a user interface on the UE (e.g., by scanning a Quick Response (QR) code). Such solutions are limiting because they require certain user interaction at the UE. Other methods, such as using IP based discovery mechanisms, (e.g., (Subscription Manager-Discovery Server (SM-DS)) as defined within Global System for Mobile Communications (GSMA) Remote Subscriber Identity Module Provisioning (RSP) specifications, for example, require the onboarding network to allow traffic dedicated to the specific IP based discovery mechanisms.

In another alternative implementation, parameters may be statically configured in the onboarding network and provided by the ONN to the UE, (e.g., as part of PCO) during PDU Session establishment. As another alternative, DNS or DNS Service Discovery (SD) mechanisms may be utilized. However, with use of static parameters and/or DNS, the onboarding UE cannot trust the provisioning parameters provided by the onboarding network, as the UE has no trust relationship with the onboarding network, only the DCS. Thus, an additional trust mechanism is needed during the actual provisioning process, which makes the provisioning more complex. One way to establish trust between UE and PVS/SO-SNPN is a voucher defined in an Internet Engineering Task Force (IETF) Bootstrapping Remote Secure Key Infrastructure (BRSKI) standard. This is however specific to the BRSKI protocol and requires additional interaction between the UE, PVS and DCS.

As discussed above and in further detail herein, certain onboarding processes include the DCS providing the PVS Fully Qualified Domain Name (FQDN) or PVS IP address to the ONN during primary authentication of the device. However, in many instances the integrity of the PVS FQDN or PVS IP address cannot be verified.

Example embodiments provided herein therefore improve upon such processes involving provision of provisioning parameters, by establishing or improving the integrity of the provisioning parameters provided to the UE.

According to certain example embodiments disclosed herein, EAP, and/or Tunnel EAP (TEAP) may be used during onboarding for secure configuration of the provisioning protocol between provisioning server and the UE. In contrast to alternative methods, such as BRSKI, the methods for configuration of the provisioning protocol disclosed herein are not bound to specific provisioning protocols, but rather apply to all user plane implementations of UE provisioning enabled by 3rd Generation Partnership Project (3GPP) Technical Specification Group Service and System Aspects (TSG SA) (SA2). Accordingly, certain example embodiments provide a mechanism for a secure configuration of a provisioning protocol. In this regard, the UE receives information related to the provisioning, which it can trust. The mechanism for providing this trusted information is independent from the provisioning protocol, while the content of the information might depend on the provisioning protocol. Other implementations developed without the advantages of the present disclosures, such as but not limited to IETF BRSKI, may contain a mechanism for providing trusted information related to the provisioning to the UE. However, such a mechanism is specific to BRSKI and cannot be combined with other provisioning protocols.

According to certain embodiments utilizing the TEAP method, provisioning parameters are provided in a secure way to an onboarding UE during primary authentication with a DCS using TEAP. The DCS can be an Authentication Authorization and Accounting (AAA) server or Authentication Server Function (AUSF). There is no need to pre-configure these parameters on the UE, such as during manufacturing or in all potential ON-SNPN, which might be many, even in different countries. According to certain embodiments described herein, the onboarding UE and the DCS mutually authenticate each other during the first phase of the execution of the TEAP protocol (e.g., tunnel establishment and mutual authentication between UE and DCS). As a result, in the second phase of execution of the TEAP protocol, the secure tunnel is used to convey secure provisioning parameters from the DCS to the onboarding UE using inner Type-Length-Value tunnels (TLVs). Since this information is conveyed in the secure tunnel, the UE can treat this information as trustworthy.

According to certain embodiments disclosed herein, the provisioning parameters may include the FQDN or IP address of the PVS. The parameters not only provide the way for the UE to establish communication with the PVS, but they also provide an authenticable identity of the PVS the UE can trust. In certain embodiments, a FQDN may be used for that purpose, with the assumption that only the valid PVS can present the UE a certificate bound to that specific FQDN. The provisioning parameters according to example embodiments may also include a correlation identifier, which is used by the PVS to assign the provisioning request from an onboarding UE to the subscription owner.

The mechanism for conveying trusted information related to the configuration of the provisioning protocol from the DCS to the UE is independent from the provisioning protocol, such as a particular type of TLV. The content, or what specific TLV is used, might vary from provisioning protocol to provisioning protocol. Depending on the provisioning protocol, a correlation identifier may be used to avoid a scenario in which a malicious device owner, or unauthorized device, initiates the provisioning of subscriber data to an onboarding UE.

Depending on the provisioning protocol, the provisioning parameters might include other parameters as well, for instance a Certificate Authority (CA) root certificate, which can be used by the onboarding UE to verify a X.509 certificate presented by the PVS or other credentials allowing access of the device to the PVS for remote provisioning. This can be performed if the UE does not already possess the required root certificate.

Example embodiments may utilize the primary authentication process for the secure delivery of provisioning parameters, and particularly the identity of the PVS FQDN or PVS address, from the DCS to the UE. For this purpose, TEAP is used as the EAP method. As part of the TEAP session, a secure tunnel between DCS and onboarding UE is established, which is used to convey the provisioning parameters in a secure and confidentiality protected way from the DCS to the UE. According to such embodiments utilizing the secure TEAP tunnel, the UE and DCS needs to support TEAP. Although TEAP is referenced herein as an implementation option for the EAP method, it will be appreciated that certain embodiments disclosed herein may be implemented using other EAP methods that establish a secure channel and which allows conveying of information within the secure channel.

In addition to certain example embodiments disclose herein, usage of EAP methods during primary authentication is described in 3GPP TS 33.501. Tunnel Extensible Authentication Protocol (TEAP) is defined in IETF Request for Comments (RFC) 7170, TEAP Version 1. Usage of TEAP for peer provisioning is discussed in RFC 7170, including Public Key Cryptography Standards (PKCS) including PKCS #10 and PKCS #7 TLVs. Furthermore, usage of TEAP for execution of Bootstrapping Remote Key Infrastructure has been previously proposed. However, such methods do not contemplate usage of EAP and/or TEAP for provision of provisioning parameters. Certain example embodiments disclosed herein utilize TEAP to securely provide the provisioning parameters to the UE.

Additionally or alternatively, certain example embodiments disclosed herein secure the provisioning parameters without necessarily using TEAP. In such examples, the provisioning parameters are provided to the ONN by the DCS using communications between DCS and the ONN, such as but not limited to the AMF, SMF, network exposure function (NEF), and/or the like, and as described in further detail herein. The provisioning parameters are encrypted and/or digitally signed such that they cannot be accessed and/or altered by the ONN, but provided by the ONN's SMF to the UE, that is able to verify their authenticity.

According to such certain embodiments providing the provisioning parameters via the ONN, the UE performs onboarding registration and primary authentication with the DCS. The DCS then provides the provisioning parameters related to the UE to the ONN. Various implementations of this process are described in further detail herein. Example embodiments provide that the provisioning parameters are transferred from the DCS to the ONN. Depending on the protocol and the used encoding the parameters may be carried in one or more dedicated containers or objects that are distinguishable to the ONN and can be fully or partially encrypted and/or integrity protected between the DCS and the UE.

The provisioning parameter container(s) may be configured in a variety of ways by the DCS to provide readable provisioning parameters to the ONN, and secure provisioning parameters to the UE, that are not readable by the ONN. For example, using one provisioning parameter container, at least one portion of the container may include the readable (i.e., only integrity protected between DCS and UE) provisioning parameters and at least another portion of the container may include secure provisioning parameters intended for the UE (e.g., encrypted between DCS and UE) that are unreadable to the ONN. In this regard, the provisioning parameter container may be referred to as a partially readable provisioning parameter container, as a portion is readable by the ONN and a portion is not readable by the ONN.

Additionally or alternatively, at least two provisioning parameter containers may be configured, at least one of which is a readable provision parameter container (readable by the ONN), and at least one of which is a secure provisioning parameter container (e.g., unreadable by the ONN, but readable by the UE). In a circumstance in which at least two containers are used, the readable container may be described as comprising readable provisioning parameters (e.g., readable by the ONN), and the secure provisioning parameter container may be described as comprising the secure provisioning parameters (e.g., unreadable by the ONN, but readable by the UE).

Accordingly, as used herein, the term "secure" provisioning parameters may be used to describe the provisioning parameters that are readable by the UE, but unreadable by the ONN, possibly regardless of their configuration within one or more provisioning parameter containers. Accordingly, as also used herein, references to "provisioning parameter container(s)" may account for configurations in which both the readable provisioning parameters and secure provision parameters are included in one provisioning parameter container, and/or configurations in which a separate ONN-readable provisioning parameter container and a separate secure (unreadable by the ONN) provisioning parameter container are used.

The secure provisioning parameters may include one or more PVS IP addresses, PVS FQDNs, and/or PVS domains. Additionally or alternatively, the secure provisioning parameters may include other parameters the DCS wants to securely provide to the UE. Accordingly, the UE can verify the integrity of the identified PVS.

The provisioning parameter container(s) are generated by the DCS. The secure provisioning parameters and/or the secure provisioning parameter container may be secured by the DCS in a variety of ways, but are configured for readability by the UE. In certain embodiments, the secure provisioning parameters and/or the secure provisioning parameter container may be signed with DCS's private key. Additionally or alternatively to signing the secure provisioning parameters and/or the secure provisioning parameter container with the DCS's private key, in certain embodiments, the DCS encrypts the secure provisioning parameters and/or the secure provisioning parameter container with the UE's public key, in which case only the UE can decrypt the secure provisioning parameters and/or the secure provisioning parameter container, and the ONN is not able to read or utilize the secure provisioning parameters and/or secure provisioning parameter container. The securing of the provisioning parameters and/or container by via digital signature and/or encryption, enables the UE to verify that the secure provisioning parameters and/or secure provisioning parameter container have not been modified by the ONN or any other third party.

In certain embodiments, such as those in which one provisioning parameter container (e.g., a partially readable provisioning parameter container) comprises the readable provisioning parameters and secure provisioning parameters, a portion of the container is encrypted and/or signed while other parts are not, separating the information which is only visible to the UE and which is also visible to the ONN.

The ONN can read the readable provisioning parameter container and/or readable portions of a partially readable provisioning parameter container and can use the information to restrict the UE's traffic over the onboarding PDU session to only allow communication with the PVS. The readable provisioning parameters intended for the ONN may further include a traffic filter, such as a set of IP traffic flow 5- or 6-tuples, FQDN, IP address ranges, or domain.

Accordingly, with the configuration of the provisioning parameter container(s) to include readable and secure provisioning parameters, an improved UE, improved network functions of the ONN (e.g., AMF, and/or the like), and an improved DCS, are disclosed herein, to facilitate the creation of, and secure readability, of the provisioning parameter container(s).

The DCS includes the provisioning parameters in its authentication response to the AMF of the ONN, along with the onboarding device identifier (e.g., SUPI) of the UE. AMF stores the object. When the UE establishes the PDU session for remote provisioning, AMF includes the parameters to its request to SMF. The SMF provides the object to the UE using a new Protocol Configuration Option (PCO). However, such implementations do not consider encrypting and/or digitally signing the parameters to prevent modification by the ONN. Additionally or alternatively, example embodiments may differ from other implementations by adding 5 tuples and IP address ranges (which are digitally signed and/or other otherwise protected).

Accordingly, the example embodiments disclosed herein (including those utilizing TEAP and/or securely providing the provisioning parameters via the ONN) secure the provisioning parameters in such a way that a UE possessing default credentials with the DCS is able to verify that the credentials come from the DCS and have not been altered. The UE can therefore trust the PVS credentials and PVS indicated by the DCS.

Apparatus 100 of FIG. 1 is one example of an apparatus that may be configured as a UE and/or a network function such as an AMF, SMF, policy control function (PCF), NEF, AUSF, and/or the like. Apparatus 100 may additionally or alternatively be configured as a DCS, and/or PVS.

As shown in FIG. 1, the apparatus 100 includes, is associated with or is in communication with processing circuitry 20, a memory 60, a communication interface 40, and an optional user interface 80. In certain embodiments, the user interface 80 may only be present in certain embodiments, such as when apparatus 100 is implemented as a UE.

The processing circuitry 20 may be in communication with the memory device via a bus for passing information among components of the apparatus 100. The memory device 60 may be non-transitory and may include, for example, one or more volatile and/or non-volatile memories. In other words, for example, the memory device 60 may be an electronic storage device (e.g., a computer readable storage medium) comprising gates configured to store data (e.g., bits) that may be retrievable by a machine (e.g., a computing device like the processing circuitry). The memory device 60 may be configured to store information, data, content, applications, instructions, or the like for enabling the apparatus to carry out various functions in accordance with an example embodiment of the present disclosure. For example, the memory device 60 could be configured to buffer input data for processing by the processing circuitry 20. Additionally or alternatively, the memory device 60 could be configured to store instructions for execution by the processing circuitry 20.

The apparatus 100 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 20 may be embodied in a number of different ways. For example, the processing circuitry 20 may be embodied as one or more of various hardware processing means such as a coprocessor, a microprocessor, a controller, a Digital Signal Processor (DSP), a processing element with or without an accompanying DSP, or various other circuitry including integrated circuits such as, for example, an Application Specific Integrated Circuit (ASIC), a Field Programmable Gate Array (FPGA), a Microcontroller Unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 20 may be configured to execute instructions stored in the memory device 60 or otherwise accessible to the processing circuitry 20. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry 20 is embodied as an executor of instructions, the instructions may specifically configure the processor to perform the algorithms and/or operations described herein when the instructions are executed. However, in some cases, the processing circuitry 20 may be a processor of a specific device (e.g., an image or video processing system) configured to employ an embodiment of the present invention by further configuration of the processing circuitry by instructions for performing the algorithms and/or operations described herein. The processing circuitry 20 may include, among other things, a clock, an Arithmetic Logic Unit (ALU) and logic gates configured to support operation of the processing circuitry.

The communication interface 40 may be any means such as a device or circuitry embodied in either hardware or a combination of hardware and software that is configured to receive and/or transmit data, including media content in the form of video or image files, one or more audio tracks or the like. In this regard, the communication interface 40 may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, Digital Subscriber Line (DSL), Universal Serial Bus (USB) or other mechanisms.

The optional user interface 80 may be in communication with the processing circuitry 20 to receive an indication of a user input at the user interface 80 and/or to provide an audible, visual, mechanical, or other output to the user. As such, the user interface 80 may include, for example, a keyboard, a mouse, a display, a touch screen display, a microphone, a speaker, and/or other input/output mechanisms. As such, in embodiments in which apparatus 100 implemented as a UE, the user interface 80 may, in some example embodiments, provide means for user entry of information regarding a network subscription, such as to purchase a subscription and/or to otherwise initiate the registration process with a non-public network. In some example embodiments, aspects of user interface 80 may be limited or the user interface 80 may not be present, such as when apparatus 100 is embodied by a network function, DCS, and/or the like.

Referring now to FIG. 2, an example flowchart of operations implemented by various instances of apparatus 100 is provided. Apparatus 100 may be embodied by UE 200, a default credentials server 210, a PVS 220, SO-SNPN Portal 230, a device accessible by a device owner 240, and/or the like. It will be appreciated that although certain components are illustrated independently, some may be implemented by the same apparatus 100. For example, PVS 220, and SO-SNPN Portal 230 may be implemented as a single apparatus. It will be appreciated that the separately illustrated UE 200s are indeed by implemented at the same UE. It will be understood that the Onboarding Network (ONN) is not illustrated in FIG. 2 or 3, but that it facilitates communication of certain data between the UE 200 and DCS 210, or between the UE 200 and PVS 220.

According to example embodiments, a configuration subprocess A is executed, including operations 1-4 of FIG. 2. As illustrated by operation 1, the device owner of UE 200 orders a subscription via a SO-SNPN portal 230. Accordingly, the apparatus 100 embodied by a network entity, such as SO-SNPN portal 230 and/or PVS 220, may include means, such as processing circuity 20, communication interface 40, memory 60, and/or the like, for receiving the subscription request. In certain embodiments, a device owner 240 may subscribe to a network by accessing the SO-SNPN portal 230, such as over a user interface 80 of any network-capable device.

At operation 2, apparatus 100 embodied by a network entity, such as PVS 220 includes means, such as processing circuity 20, communication interface 40, memory 60, and/or the like, for confirming the new subscription and generating and/or providing to the PVS, such as an SO-SNPN PVS, a correlation identifier in association with the subscription data. The correlation identifier is therefore configured at the PVS (e.g., PVS 220).

As shown by operation 3 of FIG. 2, apparatus 100 embodied by a network entity, such as SO-SNPN portal 230 and/or PVS 220, may include means, such as processing circuity 20, communication interface 40, memory 60, and/or the like, for transmitting the FQDN and the correlation identifier to UE 200.

As shown by operation 4 of FIG. 2, apparatus 100 embodied by a network entity, such as DCS 210, includes means, such as processing circuity 20, communication interface 40, memory 60, and/or the like, for configuring the PVS address and correlation identifier for a device, which is identified by its onboarding device identifier (e.g., SUPI) and received from the UE 200. Accordingly, the DCS 210 verifies the device ownership such that only the legitimate device owner is able to complete registration with the DCS 210.

Following subprocess A, such as operations 1-4 described above, the UE 200 has configured provisioning parameters, (e.g., PVS FQDN or PVS IP address and a correlation identifier for remote provisioning the UE by the PVS). In certain embodiments, the onboarding subprocess B may be described as including operations such as operations 5-9 described below.

As shown by operation 5 of FIG. 2, apparatus 100 embodied by a network entity, such as, DCS 210 and UE 200, includes means, such as processing circuity 20, communication interface 40, memory 60, and/or the like, for exchanging EAP based primary authentication messages. According to certain embodiments, instead of EAP-Transport Layer Security (TLS), TEAP is used as the EAP method. The onboarding UE 200 uses its onboarding device identifier (e.g., SUPI) as and identifier during TEAP tunnel establishment.

In operation 6 of FIG. 2, after the tunnel establishment, apparatus 100 embodied by a network entity, such as, DCS 210 and UE 200, includes means, such as processing circuity 20, communication interface 40, memory 60, and/or the like, for establishing an inner TLV within the TEAP tunnel to send the PVS FQDN or PVS IP address or other data, such as from the DCS 210 to UE 200. The inner TLV may also be used to convey the identity of the PVS 220 to the UE 200 that the UE 200 should trust, to the onboarding UE. This helps avoid tampering of the provisioning parameters by a potentially rogue ON-SNPN and/or other unauthorized devices.

In operation 7 of FIG. 2, apparatus 100 embodied by a network entity, such as, DCS 210 and UE 200, includes means, such as processing circuity 20, communication interface 40, memory 60, and/or the like, for providing other provisioning parameters, such as the correlation identifier, from the DCS to the onboarding UE 200, utilizing TLVs such as but not limited to vendor-specific TLVs, in which the content is not defined by the RFC, but can rather be defined by another entity or vendor. In certain embodiments, operations 6 and 7 may be combined. For example, several provisioning parameters may be provided in one EAP message.

After provisioning parameters have been conveyed to the onboarding UE 200, primary authentication is successfully completed. In certain embodiments, as shown by operation 8, apparatus 100 embodied by a network entity, such as, DCS 210 includes means, such as processing circuitry 20, communication interface 40, memory 60, and/or the like, for informing the DCS, via the onboarding network, (e.g., DCS 210) about the (successful) authentication, and providing the key material, such as $K_{SEAF}$, needed by the ON-SNPN to start generating the 5G key hierarchy.

In operation 7 of FIG. 2, apparatus 100 embodied by a network entity, such as, UE 200, includes means, such as processing circuitry 20, communication interface 40, memory 60, and/or the like, for using the provisioning parameters to establish an IP based connection for provisioning with the PVS 220. If the UE 200 successfully authenticates the PVS 220 to be the owner of the PVS identity securely provided by the DCS in operation 6, the UE 200 authorizes the PVS 220 to provide credentials or subscription profile from the valid SO-SNPN as designated by the device owner in the configuration, or operations 1-4 of FIG. 2.

According to certain embodiments, since the EAP messages are terminated by the onboarding UE 200 and the DCS 210, the ONN transporting the messages between onboarding UE 200 and DCS 210, is not shown in FIG. 2. According to embodiments implemented without the advantages of the present disclosure, between the onboarding UE 200 and the AMF of the onboarding network, Non-Access Stratum (NAS) containers are often used. However, according to example embodiments provided herein, data communication between the AMF and DCS can use Service Based Architecture messages or, if the DCS 210 is deployed as an AAA server, radius/diameter or any other messages can be utilized.

FIG. 3 is a flowchart of operations for providing data communication between the UE 200 and DCS 210. Operations 1-6 may include onboarding the UE 200, and the DCS 210 executing TEAP messages as commonly known. For example, in operation 1, the DCS 210 initiates a TEAP session by requesting the TEAP session with the UE 200. In operation 2, the UE 200 responds such as with an EAP Response, such as with a TLS message. In operation 3, the DCS 210 provides a certificate with a TLS message. In operation 4, the UE 210 responds with a confirmation that the TLS certificate is verified. In operation 5, the DCS 210 confirms the crypto-binding with the UE 210. In operation 6, the UE 210 confirms the crypto-binding with the DCS 210.

In operation 7 of FIG. 3, according to certain example embodiments, the apparatus 100, such as an apparatus embodied by the DCS 210, includes means, such as processing circuitry 20, communication interface 40, memory 60, and/or the like, for sending a TEAP message to UE 200, including an inner TLV for each attribute of the provisioning parameters, such as but not limited to a PVS FQDN TLV, a correlation identifier TLV, and/or other TLVs for other provisioning parameters. The necessary TLVs to transport provisioning parameters can be defined as TLVs of type Vendor TLV as specified in RFC7170, for example.

As shown in operation 8, the apparatus 100, such as an apparatus embodied by the UE 200, includes means, such as processing circuity 20, communication interface 40, memory 60, and/or the like, for confirming the TLV data communication with the DCS 210. The confirmation is provided by sending a success message.

In operation 9, apparatus 100 such as an apparatus embodied by DCS 210, includes means, such as processing circuitry 20, communication interface 40, memory 60, and/or the like, for responding with an EAP success message as confirmation of the TLV communication.

FIG. 4 is a flowchart of operations that may be performed by apparatus 100 according to certain example embodiments, such as when apparatus 100 is embodied by a DCS 210. As shown in operation 400, apparatus 100 embodied by a network entity, such as, DCS 210, includes means, such as processing circuitry 20, communication interface 40, memory 60, and/or the like, for receiving from a device, in association with an onboarding request by the device, an authentication message. The authentication message may include a device identifier, such as a SUPI, identifying the onboarding UE. Operation 400 of FIG. 4 may be implemented similarly to operation 4 of FIG. 2. For example, during authentication, the DCS 210 receives the configuration including the device identifier (e.g., SUPI), PVS FQDN, and the correlation identifier.

As shown in operation 402, apparatus 100 embodied by a network entity, such as, DCS 210, includes means, such as processing circuitry 20, communication interface 40, memory 60, and/or the like, for, in response to receiving the authentication message, establishing a secure communication tunnel with the device. As described herein, the secure communication tunnel may be the TEAP tunnel to the UE 200, such as that described with respect to FIG. 3, and FIG. 2, operation 5.

As shown in operation 404, apparatus 100 embodied by a network entity, such as, DCS 210, includes means, such as processing circuitry 20, communication interface 40, memory 60, and/or the like, for causing transmission of, within the secure communication tunnel to the device (e.g., UE 200), provisioning parameters comprising at least an address of a provisioning server, and a correlation identifier associated with a subscription data entity configured by the provisioning server. According to certain embodiments, the provisioning parameters may be transmitted via one or more Type-Length-Value (TLV) tunnels within the secure communication tunnel. See, for example, FIG. 3 operation 7, and FIG. 2 operations 6 and 7. According to certain embodiments, the address of the provisioning server comprises at least one of a provisioning server FQDN or IP address or IP address range of the provisioning server. In this regard, the DCS 210 securely provides the provisioning parameters to the UE 200 to ensure they have not been modified by an unauthorized device. The provisioning parameters enable IP communication between the device and the provisioning server for provisioning of at least one of credentials or a subscription profile, to further enable network connectivity between the device and a non-public network associated with the provisioning server.

FIG. 5 is a flowchart of operations that may be performed by apparatus 100 according to certain example embodiments, such as when apparatus 100 is embodied by a UE 200. As shown in operation 500, apparatus 100 embodied by a UE 200, includes means, such as processing circuity 20, communication interface 40, memory 60, and/or the like, for causing transmission of an authentication message to an authentication server, such as DCS 210. The authentication message includes a device identifier associated with an onboarding request by the apparatus (e.g., UE 200). For example, see operation 4 of FIG. 2. The device identifier may be a SUPI. The authentication message may be considered a configuration request, and may further include a PVS address (such as PVS FQDN or IP address), and a correlation identifier such as those provided from an PVS 220 and/or SO-SNPN portal 230 in response to the associated onboarding request. The association to the onboarding request may be indicated by the correlation identifier as described with respect to operations 1-3 of FIG. 2.

As shown in operation 502, apparatus 100 embodied by a UE 200, includes means, such as processing circuitry 20, communication interface 40, memory 60, and/or the like, for receiving, within a secure communication tunnel with the authentication server (e.g., DCS 210), provisioning parameters comprising at least an address of a provisioning server address. In certain embodiments, the provisioning parameters may further comprise a correlation identifier associated with a subscription data entity configured with the provisioning server, such as PVS 220. The provisioning parameters may be provided via one or more Type-Length-Value (TLV) tunnels within the secure communication tunnel. The provisioning server address comprises at least one of a provisioning server FQDN, IP address, or IP address range. For example, see at least operations 5-7 of FIG. 2, and operation 7 of FIG. 3.

As shown in operation 504, apparatus 100 embodied by a UE 200, includes means, such as processing circuitry 20, communication interface 40, memory 60, and/or the like, for using the provisioning parameters, establishing an Internet Protocol (IP) communication session with the provisioning server, such as PVS 220. For example, see operation 9 of FIG. 2.

As shown in operation 506, apparatus 100 embodied by a UE 200, includes means, such as processing circuitry 20, communication interface 40, memory 60, and/or the like, for receiving via the IP communication session with the provisioning server (such as PVS 220), at least one of credentials or a subscription profile. The credentials or subscription profile enable access to the non-public network associated with the PVS 220. Accordingly, the UE can ensure the identified provisioning server can be trusted because the provisioning parameters are provided securely and should not be modified by an unauthorized device.

In operation 508, apparatus 100 embodied by a UE 200, includes means, such as processing circuitry 20, communication interface 40, memory 60, and/or the like, for, using the at least one of the credentials or the subscription profile, establishing network connectivity with a non-public network associated with the provisioning server.

FIGS. 6-8 are flowcharts of additional or alternative operations for configuring parameters for onboarding a UE, which may be implemented according to certain example embodiments. Certain operations of FIGS. 6-8 share some overlap and similarities with each other. For example, operations of FIGS. 9A and 10A includes certain operations that are described in each of FIGS. 6, 7 and 8.

In operation 1 of FIG. 6, apparatus 100 embodied by a UE 200 includes means, such as processing circuitry 20, communication interface 40, memory 60 and/or the like, for requesting onboarding registration with the onboarding network 600, such as via the AMF 610.

At operation 2, apparatus 100 embodied by a network entity, such as ONN 600, AMF 610, and/or the like includes means, such as processing circuitry 20, communication interface 40, memory 60, and/or the like, for authenticating the UE 200 towards the DCS 210, such as via the AUSF 630. It will be appreciated that in certain embodiments the AUSF 630 may be part of ONN 600 (although not illustrated this way in FIG. 6).

At operation 3, in response to authentication of the UE 200, the DCS 210 includes means, such as processing circuitry 20, communication interface 40, memory 60 and/or the like, for generating the provisioning parameter container (s), including at least one of (a) a partially readable provisioning parameter container comprising readable provisioning parameters and secure provisioning parameters, or (b) a readable provisioning parameter container comprising the readable provisioning parameters and a secure provisioning parameter container comprising the secure provisioning parameters.

In operations 4 and 5, apparatus 100 embodied by DCS 210 includes means, such as processing circuitry 20, communication interface 40, memory 60 and/or the like, for responding to authentication, via the AUSF 630 and toward the AMF 610. If the authentication is successful and provisioning parameters for the UE 200 are available, DCS 210 includes an indicator towards the AMF 610 within the metadata. In certain embodiments, the metadata may include one or more Uniform Resource Locators (URLs) pointing to the provisioning parameter container(s) stored by the DCS 210. In this regard, the URL may reference an Application Programming Interface (API) of the DCS 210. In certain example embodiments, the provisioning parameter indicator may include authorization information, such as a, username and password and/or the like allowing the DCS to verify that the requestor is authorized to access the data. For example, RFC6749 specifies an access token that define specific scopes and durations of access, granted and enforced by the DCS, for accessing the provisioning parameter container(s) on the DCS.

It will be appreciated that the DCS 210 according to certain example embodiments does not necessarily include the provisioning-parameter container to the AMF 610 in ONN 600 during the authentication phase, but just provides the AMF 610 with a provisioning parameter indication. This indication may be a flag that tells the AMF 610 (and/or the ONN 600) that provisioning parameters are now available for the UE 200. In addition to the flag, the indicator can contain a URL pointing to the container(s) and to other metadata.

As shown by operation 6, apparatus 100 embodied by a network entity, such as ONN 600 and/or AMF 610, includes means, such as processing circuitry 20, communication interface 40, memory 60, and/or the like, for indicating to the UE 200 that registration is accepted. Additionally and/or alternatively, the AMF 610 stores the provisioning parameter indicator and the metadata for the UE 200.

As shown by operation 7, apparatus 100 embodied by a UE 200, and/or network entity such as ONN 600, AMF 610, and/or the like, includes means, such as processing circuitry 20, communication interface 40, memory 60, and/or the like, for establishing an onboarding PDU session between the UE 200 and ONN 600 (e.g., AMF 610).

As shown by operation 8, apparatus 100 embodied by a network entity, such as AMF 610, includes means, such as processing circuitry 20, communication interface 40, memory 60, and/or the like, for providing the provisioning parameter indicator and metadata to SMF 620. In this regard, the indicator is passed from AMF 610 to SMF 620 during UE 200's onboarding PDU session establishment.

As shown by operation 9, apparatus 100 embodied by a network entity, such as SMF 620, includes means, such as processing circuitry 20, communication interface 40, memory 60, and/or the like, for requesting provisioning parameters from DCS 210 based on the indicator and metadata (e.g., URL(s)). According to certain embodiments, if SMF 620 itself does not have the capability of making the request, the request could be made on behalf of SMF by some other network function or authentication function with which the SMF 620 communicates. The SMF 620 uses the indicator and the metadata (such as URL(s)) to fetch the provisioning parameter container(s) from the DCS 210.

As shown by operation 10, apparatus 100 embodied by a network entity, such as DCS 210, includes means, such as processing circuitry 20, communication interface 40, memory 60, and/or the like, for providing the provisioning parameter container(s) to SMF 610.

As shown by operation 11, apparatus 100 embodied by a network entity, such as SMF 620, includes means, such as processing circuitry 20, communication interface 40, memory 60, and/or the like, for providing the provisioning parameter container(s) to UE 200 with a new PCO. Accordingly, the UE 200 can utilize the provisioning parameter container(s) to read the secure provisioning parameters (such as by decryption and/or signature verification) to establish an IP session with a provisioning server and obtain a subscription profile to access the non-public network, and ensure the integrity of the provisioning parameters.

In operation 1 of FIG. 7, apparatus 100 embodied by a UE 200 requests onboarding registration with the onboarding network 600, such as via the AMF 610.

At operations 2 and 3 of FIG. 7, apparatus 100 embodied by a network entity, such as ONN 600 and/or AMF 610, includes means, such as processing circuitry 20, communication interface 40, memory 60, and/or the like, for authenticating the UE 200 towards the DCS 210, such as via the AUSF 630. It will be appreciated that in certain embodiments the AUSF 630 may be part of ONN 600. In certain embodiments, the AUSF 630 may be implemented by the DCS 630. The AMF 610 and/or AUSF 630 may add an indicator that the ONN 600 supports provisioning parameters via NEF 720, identified by a provided NEF indication, such as but not limited to a NEF API URL, Data Network Name Single Network Slice Selection Assistance Information. (DNN/S-NSSAI), or a UE 200 specific resource (e.g., Uniform Resource Identifier (URI)).

In response to operation 3, apparatus 100 embodied by a the DCS 210 includes means, such as processing circuitry 20, communication interface 40, memory 60, and/or the like, for generating the provisioning parameter container(s).

In operations 4 and 5 of FIG. 7, apparatus 100 embodied by a the DCS 210 includes means, such as processing circuitry 20, communication interface 40, memory 60, and/or the like, for responding to authentication, via the AUSF 630 and toward the AMF 610. If the authentication is successful and provisioning parameters for the UE are available, DCS 210 includes an indicator that the provisioning parameter container(s) are available, in the response towards the AMF, and via the AUSF 630.

Operations A-E initiated after operation 4 of FIG. 7, provide additional variations in comparison to the process described with respect to FIG. 6.

At operation A of FIG. 7, apparatus 100 embodied by a network entity, such as DCS 210, includes means, such as processing circuitry 20, communication interface 40, memory 60, and/or the like, for providing the provisioning parameter container(s) to ONN NEF 720, such as by using the URL(s) provided by the AMF 610. The DCS 210 provides the provisioning parameter container(s) with UE ID (e.g., onboarding SUPI or Generic Public Subscription Identifier (GPSI)) to the NEF 720 in ONN 600.

At operation B of FIG. 7, apparatus 100 embodied by a network entity, such as NEF 720, includes means, such as processing circuitry 20, memory 60, and/or the like, for storing the provisioning parameter container(s) to Uniform Data Repository (UDR) 710.

In certain embodiments, it is possible for the DCS 210 to provide a particular ONN 600 with a UE-specific provisioning parameter container before the UE 200 registers via that ONN 600 for onboarding. In such embodiments in which the provisioning parameter container is stored in the UDR 710 following authentication at operation 4 (or prior to authentication), although not depicted in FIG. 7, operations A and B may be skipped. In such circumstances, the DCS 210 is aware which ONN 600 the UE 200 is using and the provisioning parameter container(s) would be available at the ONN (e.g., in UDR 710).

At operation C of FIG. 7, apparatus 100 embodied by a network entity, such as UDR 710, includes means, such as processing circuitry 20, communication interface 40, memory 60, and/or the like, for notifying PCF 700 of the provisioning parameter container(s) such that the PCF 700 obtains the provisioning parameter container(s) from UDR. However, according to certain embodiments, it is possible for NEF 720 to bypass UDR 710 and provide the provisioning parameter container(s) to PCF 700 or even bypass PCF 700 and provide the provisioning parameter container (s) directly to the SMF in a container upon request or subscription from PCF 700 or SMF 620 to the NEF 720 or based on DNN/S-NSSAI, if available.

At operation 6 of FIG. 7, apparatus 100 embodied by a network entity, such as AMF 610, includes means, such as processing circuitry 20, communication interface 40, memory 60, and/or the like, for indicating to the UE 200 that registration is accepted, and storing the provisioning parameter indicator and metadata for the UE 200. It will be appreciated that operation 6 may occur responsive to operation 5, and that operations A-C may occur concurrently with initiation of operation 6, or responsive to operation 3 (authentication).

At operation 7 of FIG. 7, apparatus 100 embodied by UE 200, and/or apparatus 100 embodied by a network entity such as ONN 600, AMF 610 and/or the like includes means, such as processing circuitry 20, communication interface 40, memory 60, and/or the like, for establishing an onboarding PDU session between the UE 200 and ONN 600, such as via the AMF 610. In a circumstance the provisioning parameter container is available prior to authentication (operation 4), and operations A and B are skipped (not illustrated in FIG. 7) the container would be provided to the SMF 620 when the UE 200 establishes the onboarding PDU session.

At operation 8 of FIG. 7, apparatus 100 embodied by a network entity, such as ONN 600, AMF 610, and/or the like, includes means, such as processing circuitry 20, communication interface 40, memory 60, and/or the like, for providing the provisioning parameter indicator to SMF 620.

At operation 9 of FIG. 7, apparatus 100 embodied by a network entity, such as SMF 620, includes means, such as processing circuitry 20, communication interface 40, memory 60, and/or the like, for contacting the PCF 700 to retrieve policy rules.

At operation 10 and/or operation D of FIG. 7, apparatus 100 embodied by a network entity, such as PCF 700, includes means, such as processing circuitry 20, communication interface 40, memory 60, and/or the like, for providing policy rules to SMF 620 including the provisioning parameter container(s) in a circumstance the provisioning parameter container(s) are available. In this regard, PCF 700 can provide the provisioning parameter container to the SMF 620 during the UE 200's onboarding PDU session establishment, if the provisioning parameter container is available at the time, and SMF 620 provides provisioning parameter container(s) to the UE 200 within a new PCO. The retrieval of policy rules may occur in other implementations. However, provisioning information described according to example embodiments can be included in the policy rules provided toward the SMF 620. Circumstances in which the containers are not available are described with respect to FIG. 8.

At operation 11 and/or operation E of FIG. 7, apparatus 100 embodied by a network entity, such as SMF 620, includes means, such as processing circuitry 20, communication interface 40, memory 60, and/or the like, for providing the provisioning parameter container(s) to UE 200 within a new PCO. The provisioning parameter container(s) are therefore received at the UE in a secure manner and the UE can read the provisioning parameters to access the PVS.

The operations of FIG. 8 have overlap with FIG. 7, but provide operations in circumstances when the provisioning parameter container(s) are not yet available when the UE 200 establishes the onboarding PDU session.

In this regard, in certain embodiments, if operation C does not occur until after operation 10, as illustrated in FIG. 8, meaning the provisioning parameters are not available (the DCS 210 has not yet provided them to the NEF) when the UE 200 establishes the onboarding PDU session, the following operations may be performed differently than the operations described with respect to FIG. 7 according to example embodiments.

At operation 11 of FIG. 8, apparatus 100 embodied by a network entity, such as SMF 620, includes means, such as processing circuitry 20, communication interface 40, memory 60, and/or the like, for providing a pending provisioning parameter container and/or empty provisioning parameter container to UE 200 within a new PCO. Based on the pending and/or empty container the UE 200 determines that the parameters will be provided at a later stage. According to certain example embodiments, SMF 620 may optionally proceed with the PDU session and provide the UE 200 in a PCO an empty or pending parameter container indication.

In this regard, the SMF 620 and/or PCF 700 may subscribe with the NEF 720 for notification of provisioning parameter container(s) availability. When the provisioning parameter container(s) are available via NEF 720 (operation A), NEF 720 stores them to the UDR 710 (operation B), UDR 710 notifies the PCF 700 (operation C), and PCF 700 notifies the SMF 620 (operation D). SMF 620 can then proceed with the PDU session establishment and/or modification.

SMF 620 then proceeds with the PDU establishment and/or issues a PDU session modification towards the UE 200 and provides the provisioning parameter container, including the secure provisioning parameters, to the UE 200 within PCO (operation 12). In this regard, the apparatus 100, when embodied by a network entity, such as ONN 600 and/or SMF 620, includes means, such as processing circuitry 20, communication interface 40, memory 60, and/or the like, for modifying an established PDU session to provide secure provisioning parameters.

As yet another example embodiment, if SMF 620 does not have the provisioning parameter container(s) available when UE 200 imitates the PDU session for remote provisioning, SMF 620 can use the indicator (e.g., NEF URL and/or PVS FQDN) to contact the PVS either directly or via NEF 720 and fetch the parameters from the PVS using the UE 200's onboarding SUPI as the UE identifier.

Although not specifically indicated in FIGS. 6-8, according to example embodiments described herein with respect to FIGS. 6-8, the ONN 600 may use a readable provisioning parameter container and/or readable portion thereof to configure traffic restrictions on the onboarding PDU session. In this regard, the SMF 620 configures these traffic restrictions on the user plane function (UPF). The ONN 600 may obtain this information by reading the parameters provided to the UE 200 (in circumstances in which certain parameters intended for the ONN are not encrypted). In certain embodiments, the DCS 210 provides a separate ONN-provisioning-parameter container to the ONN and intended for the ONN that is readable by the AMF 610. The ensures example embodiments may provide certain secure provisioning parameters to the UE 200, and certain parameters that are readable by the ONN.

FIGS. 9A-9C are flowcharts of operations that may be performed by apparatus 100 when embodied by DCS 210. Some operations of FIGS. 9A-9C are the same or similar to those of FIGS. 6-8.

As shown by operation 900, apparatus 100 embodied by a DCS 210 includes means, such as processing circuitry 20, communication interface 40, memory 60, and/or the like, for authenticating a device, such as UE 200, requesting onboarding to a non-public network. Operation 900 may be implemented as described with respect to operations 1-3 of FIGS. 6, 7, and 8.

As shown by operation 902, apparatus 100 embodied by a DCS 210 includes means, such as processing circuitry 20, memory 60, and/or the like, for generating at least one of (a) a partially readable provisioning parameter container comprising readable provisioning parameters and secure provisioning parameters, or (b) a readable provisioning parameter container comprising the readable provisioning parameters and a secure provisioning parameter container comprising the secure provisioning parameters, wherein the at least one of the secure provisioning parameter container or the secure provisioning parameters are secured by at least one of signing with a private key, or encrypting with a public key of the device.

As shown by operation 904, apparatus 100 embodied by a DCS 210 includes means, such as processing circuitry 20, communication interface 40, memory 60, and/or the like, for providing, or causing transmission of, a provisioning parameter indicator toward a network function of an onboarding device (UE 200). The network function may include the AUSF 630 and/or AMF 610 as reflected in operations 4 and 5 of FIGS. 6, 7 and 8.

As shown by operation 906, apparatus 100 embodied by a DCS 210 includes means, such as processing circuitry 20, communication interface 40, memory 60 and/or the like, for providing the at least one of the (a) the partially readable provisioning parameter container, or (b) the readable provisioning parameter container and the secure provisioning parameter container comprising the secure provisioning parameters to the onboarding network. For example, the provisioning parameter container(s) may be provided to the SMF 620 (as indicated in operation 10 of FIG. 6, and/or to the NEF 720 (as indicated in operation A of FIGS. 7 and 8).

The operations of FIG. 9B are similar to some operations of FIG. 9A, with some variations as described below. The operations of FIG. 9B are also similar to operations of FIG. 6. Operations 900 and 902 of FIG. 9B are similar to operations 900 and 902 of FIG. 9A, such that the descriptions thereof are not repeated with respect to FIG. 9B.

Operation 904b is similar to operation 904 in that it includes providing the provisioning parameter indicator toward a network function of the ONN. At least one difference is described as follows. As shown by operation 904c, apparatus 100 embodied by a DCS 210 includes means, such as processing circuitry 20, communication interface 40, memory 60 and/or the like, for providing, or causing transmission of, a provisioning parameter indicator toward one or more network functions (e.g., AMF 610 optionally via AUSF 630) of the onboarding network, wherein the provisioning parameter indicator includes at least one URL pointing to the at least one of (a) the partially readable provisioning parameter container, or (b) the readable provisioning parameter container and the secure provisioning parameter container. Provision of the indicator is described with respect to operation 4 and 5 of FIG. 6.

Operation 906b is similar to operation 906 in that it includes providing the provisioning parameter container(s) to the ONN. At least one difference is described as follows. As shown by operation 906b, apparatus 100 embodied by a DCS 210 includes means, such as processing circuitry 20, communication interface 40, memory 60 and/or the like, for, responsive to a request via the URL, by or on behalf of an SMF, providing the at least one of (a) the partially readable provisioning parameter container, or (b) the readable provisioning parameter container and the secure provisioning parameter container to the SMF 620. Provision of the provisioning parameter container(s) is described with respect to operation 9 of FIG. 6.

The flowchart of FIG. 9C is similar to that of FIG. 9A, with some variations as described below. Some operations of FIG. 9C are also similar to operations of FIGS. 7 and 8.

Operation 900c is similar to operation 900 in that it involves authentication of a device. At least one difference is described as follows. As shown by operation 900c, apparatus 100 embodied by a DCS 210 includes means, such as processing circuitry 20, communication interface 40, memory 60 and/or the like, for authenticating a device (e.g., UE 200) requesting onboarding to a non-public network, and receiving from an AMF, a NEF indication, such as identifying NEF 720. Operation 900c is described in further detail with respect to at least operations 2 and 3 of FIGS. 7 and 8.

Operation 902 of FIG. 9C is similar to operation 902 of FIG. 9A such that it is not repeated with respect to the description of FIG. 9C.

Operation 904c of FIG. 9C is similar to operation 904 of FIG. 9A in that it includes providing a provisioning parameter indicator toward one or more network functions of an onboarding network. As shown by operation 904c, apparatus 100 embodied by a DCS 210 includes means, such as processing circuitry 20, communication interface 40, memory 60 and/or the like, for providing a provisioning parameter indicator toward one or more network functions (e.g., AMF 610 optionally via AUSF 630) of the onboarding network. Operations 904c is described with respect to at least operations 4 and 5 of FIGS. 7 and 8.

Operation 906c of FIG. 9C is similar to operation 906A in that it includes providing the at least one of the (a) the partially readable provisioning parameter container, or (b) the readable provisioning parameter container and the secure provisioning parameter container comprising the secure provisioning parameters to the onboarding network. At least one difference is described as follows. As shown by operation 906C, apparatus 100 embodied by a DCS 210 includes means, such as processing circuitry 20, communication interface 40, memory 60 and/or the like, for providing the at least one of (a) the partially readable provisioning parameter container, or (b) the readable provisioning parameter container and the secure provisioning parameter container to the NEF 720, via the NEP API. Operation 906c is described in further detail with respect to at least operation A of FIG. 7.

FIGS. 10A-10C are flowcharts of operations that may be performed by apparatus 100 when embodied by a network function, such as but not limited to ONN 600, AMF 610, SMF 620, AUSF 630, PCF 700, UDR 710, and/or NEF 720. Some operations of FIGS. 10A-10C are the same or similar to operations described with respect to FIGS. 6-8.

As shown by operation 1050, apparatus 100 embodied by a network function, such as ONN 600, SMF 620, NEF 720, includes means, such as processing circuitry 20, communication interface 40, memory 60, and/or the like, for receiving, from an authentication server, such as DCS 210, at least one of (a) a partially readable provisioning parameter container comprising readable provisioning parameters and secure provisioning parameters, or (b) a readable provisioning parameter container comprising the readable provisioning parameters and a secure provisioning parameter container comprising the secure provisioning parameters. The secure provisioning parameters are unreadable by the apparatus (e.g., the ONN 600, SMF 620, NEF 720, and/or the like). Operation 1050 is described in further detail with respect to operation 10 of FIG. 6, and operation A of FIGS. 7 and 8.

As shown by operation 1070, apparatus 100 embodied by a network function, such as ONN 600, SMF 620, includes means, such as processing circuitry 20, communication interface 40, memory 60, and/or the like, for utilizing the readable provisioning parameters to restrict data sessions with devices. For example, the SMF 620 can utilize the readable provisioning parameters to restrict the UE's traffic over the onboarding PDU session to only allow communication with the PVS and/or to establish limited connectivity sessions with traffic restrictions.

As shown by operation 1080, apparatus 100 embodied by a network function, such as ONN 600, SMF 620, includes means, such as processing circuitry 20, communication interface 40, memory 60, and/or the like, for providing, or causing transmission of, the secure provisioning parameters to an authenticated device, such as UE 200. Operation 1080 may include providing the secure provisioning parameters within a PCO data object to an authenticated device via a packet data unit (PDU) session. For example, see operation 11 of FIGS. 6 and 7, and operation 12 of FIG. 8.

FIG. 10B is a flowchart of operations, some of which are similar to operations of FIGS. 6 and 10A. In operation 1040b, apparatus 100 embodied by a network function, such as ONN 600, AMF 610 and/or AUSF 630, includes means, such as processing circuitry 20, communication interface 40, memory 60, and/or the like, for receiving, from the authentication server (e.g., DCS 210) a provisioning parameter indicator comprising at least one URL pointing to the (a) partially readable provisioning parameter container or (b) the readable provisioning parameter container and the secure provisioning parameter container, on the authentication server). Operation 1040 is described in further detail with respect to operations 4 and 5 of FIG. 6.

Operation 1050*b* of FIG. 10B is similar to operation 1050 of FIG. 10A in that it includes receiving, from a DCS, at least one of (a) a partially readable provisioning parameter container comprising readable provisioning parameters and secure provisioning parameters, or (b) a readable provisioning parameter container comprising the readable provisioning parameters and a secure provisioning parameter container comprising the secure provisioning parameters. At least one difference is described as follows. As shown by operation 1050*b*, apparatus 100 embodied by a network function, such as SMF 620, includes means, such as processing circuity 20, communication interface 40, memory 60, and/or the like, for receiving, from the authentication server (e.g., DCS 210) and via the at least one URL, the at least one of the (a) a partially readable provisioning parameter container, or (b) the readable provisioning parameter container. Operation 1050*b* is described in further detail with respect to operation 10 of FIG. 6.

Operation 1070 of FIG. 10B is similar or as the same as operation 1070 of FIG. 10A such that the description is not repeated with respect to FIG. 10B.

Operation 1080*b* of FIG. 10B is similar as operation 1080 of FIG. 10A in that it includes provide the secure provisioning parameters to an authenticated device. As shown by operation 1080*b*, apparatus 100 embodied by a network function, such as SMF 620, includes means, such as processing circuity 20, communication interface 40, memory 60, and/or the like, for providing the secure provisioning parameters within a data object (e.g., PCO) to an authenticated device via a data session, such as a PDU session. Operation 1080*b* is described in more detail with respect to operation 11 of FIG. 6.

FIG. 10C is a flowchart of operations, some of which are similar to operations of FIGS. 7, 8 and 10A.

As shown by operation 1030*c*, apparatus 100 embodied by a network function, such as ONN 600, AMF 610 and/or AUSF 630, includes means, such as processing circuity 20, communication interface 40, memory 60, and/or the like, for providing a NEF indication to the DCS, wherein the NEF indication identifies an NEF of the onboarding network.

As shown by operation 1032*c*, apparatus 100 embodied by a network function, such as ONN 600, AMF 610 and/or AUSF 630, includes means, such as processing circuity 20, communication interface 40, memory 60, and/or the like, for storing a provisioning parameter indicator and its metadata received from the DCS 210. For example, the provisioning parameter indicator is received from the DCS 210 as described with respect to operations 4-5 of FIGS. 7 and 8, and in response from receiving an authentication request via the ONN 600.

Operation 1050*c* is similar to operation 1050 of FIG. 10A in that the ONN 600 receives, from a DCS, at least one of (a) a partially readable provisioning parameter container comprising readable provisioning parameters and secure provisioning parameters, or (b) a readable provisioning parameter container comprising the readable provisioning parameters and a secure provisioning parameter container comprising the secure provisioning parameters. The secure provisioning parameters (e.g. intended for the UE 200) are unreadable by the apparatus. Operation 1050*c* specifies access of the provisioning parameter container(s) by the NEF 720. Accordingly, as shown by operation 1050*c*, apparatus 100 embodied by a network function, such as ONN 600 and/or NEF 720, includes means, such as processing circuity 20, communication interface 40, memory 60, and/or the like, for receiving from the DCS, at least one of (a) a partially readable provisioning parameter container comprising readable provisioning parameters and secure provisioning parameters, or (b) a readable provisioning parameter container comprising the readable provisioning parameters and a secure provisioning parameter container comprising the secure provisioning parameters. The secure provisioning parameters are unreadable by the apparatus 100 (e.g., ONN 600, and/or the like).

As shown by operation 1052*c*, apparatus 100 embodied by a network function, such as ONN 600, UDR 710, NEF 720, includes means, such as processing circuity 20, communication interface 40, memory 60, and/or the like, for storing the at least one of the (a) partially readable provisioning parameter container or (b) the readable provisioning parameter container and the secure provisioning parameter container, by the NEF 720 on a UDR, such as UDR 710. Operation 1052C is described in further detail with respect to operation B of FIGS. 7 and 8.

As shown by operation 1054*c*, apparatus 100 embodied by a network function, such as ONN 600, UDR 710, PCF 700, and/or the like, includes means, such as processing circuity 20, communication interface 40, memory 60, and/or the like, for notifying a PCF of the ONN. Operation 1054*c* is described in further detail with respect to operation C of FIGS. 7 and 8.

As shown by operation 1058*c*, apparatus 100 embodied by a network function, such as ONN 600, AMF 610, and/or the like, includes means, such as processing circuity 20, communication interface 40, memory 60, and/or the like, for establishing a data session, such as a PDU session, with an authenticated device such as UE 200. Operation 1058*c* is described in further detail with respect to operation 7 of FIGS. 7 and 8.

As shown by operation 1060*c*, apparatus 100 embodied by a network function, such as AMF 610, SMF 620, includes means, such as processing circuity 20, communication interface 40, memory 60, and/or the like, for providing the provisioning parameter indicator from the AMF to the SMF. Operation 1060*c* is described in further detail with respect to operation 8 of FIGS. 7 and 8.

As shown by operation 1062*c*, apparatus 100 embodied by a network function, such as ONN 600, SMF 620, PCF 700 and/or the like includes means, such as processing circuity 20, communication interface 40, memory 60, and/or the like, for retrieving, by the SMF 710, and from the PCF 700, policy rules comprising the at least one of the (a) partially readable provisioning parameter container or (b) the readable provisioning parameter container and the secure provisioning parameter container.

As shown by operation 1070*c*, apparatus 100 embodied by a network function, such as ONN 600, SMF 620, and/or the like, may include means, such as processing circuity 20, communication interface 40, memory 60, and/or the like, for utilizing the readable provisioning parameters to restrict data sessions with devices.

As shown by operation 1080*c*, apparatus 100 embodied by a network function, such as ONN 600, SMF 620, and/or the like, include means, such as processing circuity 20, communication interface 40, memory 60, and/or the like, for providing the secure provisioning parameters within a PCO data object to an authenticated device via the PDU session. The provisioning parameters may be transmitted within or independently of any provision parameter container. Operation 1080*c* is described in more detail with respect to operation 11 of FIG. 7 and operation 12 of FIG. 8. As described herein, the secure provisioning parameters can be utilized by the UE to access a PVS to establish connectivity to connect to a non-public network.

FIG. 11 is a flowchart of operations that may be performed by UE 200 to facilitate onboarding to a network according to certain example embodiments. The operations of FIG. 11 have certain overlap with operations of FIGS. 7 and 8.

As shown in operation 1100, apparatus 100 embodied by a UE 200, includes means, such as processing circuit 20, communication interface 40, memory 60, and/or the like, for performing onboarding registration and authentication with an authentication server, such as DCS 210. See for example operations 1 and 6 of FIGS. 7 and 8.

As shown in operation 1102, apparatus 100 embodied by a UE 200, includes means, such as processing circuit 20, communication interface 40, memory 60, and/or the like, for establishing a data session, such as a PDU session, with an onboarding network associated with the authentication server. See for example, operation 7 of FIGS. 7 and 8.

As shown in operation 1104, apparatus 100 embodied by a UE 200, includes means, such as processing circuit 20, communication interface 40, memory 60, and/or the like, for receiving, via the data session, such as a PDU session, a provisioning parameter container. See for example, operation 11 of FIGS. 7 and 8.

As shown in operation 1106, apparatus 100 embodied by a UE 200, includes means, such as processing circuit 20, communication interface 40, memory 60, and/or the like, for accessing at least secure provisioning parameters in a Protocol Configuration Options (PCO) data object by performing at least one of decryption with a private key, or signature verification with a public key of the authentication server (e.g., DCS 210), of the provisioning parameter container or a portion thereof, wherein the secure provisioning parameters enable network connectivity with a non-public network.

As described above, the operations of FIGS. 2-5 describe secure communication of provisioning parameters from the DCS 210 via a TEAP tunnel, while the operations of FIGS. 6-8, 9A-9C, 10A-10C, and 11 describe secure communication of the provisioning parameters via one or more provisioning parameter containers via the ONN 600. It will be appreciated that in certain embodiments, some combination of the data communication via the TEAP tunnel and the containers transmitted via the ONN may be implemented. For example, the secure parameters intended for the UE may be transmitted via the TEAP tunnel, and the ONN related parameters (for traffic restrictions and policing) are provided to the ONN in a provisioning parameter container. In such circumstances, the SMF does not provide any of these ONN-targeted parameters to the UE via PCO, but SMF/PCF uses the ONN related parameters to configure traffic restrictions on the UPF.

FIGS. 2-8, 9A-9C, 10A-10C, and 11 illustrate message flows and flow charts depicting methods according to an example embodiment of the present invention. It will be understood that each block of the message flow may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 60 of an apparatus 100 employing an embodiment of the present invention and executed by a processing circuitry 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts and message flows support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Although several variations have been described in detail above, other modifications or additions are possible. Further features and/or variations may be provided in addition to those set forth herein. Moreover, the implementations described above may be directed to various combinations and sub-combinations of the disclosed features and/or combinations and sub-combinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

It should therefore again be emphasized that the various embodiments described herein are presented by way of illustrative example only and should not be construed as limiting the scope of the claims. For example, alternative embodiments can utilize different communication system configurations, user equipment configurations, base station configurations, identity request processes, messaging protocols and message formats than those described above in the context of the illustrative embodiments. These and numerous other alternative embodiments within the scope of the appended claims will be readily apparent to those skilled in the art.

That which is claimed is:

1. An apparatus comprising processing circuitry and at least one memory including computer program code, the at least one memory and the computer program code configured to, with the processing circuitry, cause the apparatus to at least:
receive from a device, in association with an onboarding request by the device, an authentication message;
in response to receiving the authentication message, establish a secure communication tunnel with the device using an Extensible Authentication Protocol; and
transmit to the device, via the secure communication tunnel, provisioning parameters for the device to use to communicate with a provisioning server using an Internet Protocol (IP) to obtain a subscription profile or credential to a standalone non-public network (SO-NPN), the provisioning parameters comprising at least an address of the provisioning server, wherein the address of the provisioning server comprises a provisioning server Fully Qualified Domain Name (FQDN), an Internet protocol (IP) address or an IP address range.

2. The apparatus according to claim 1, wherein the provisioning parameters further comprise a correlation identifier associated with a subscription data entity configured by the provisioning server.

3. An apparatus comprising processing circuitry and at least one memory including computer program code, the at least one memory and the computer program code configured to, with the processing circuitry, cause the apparatus to at least:
cause transmission of an authentication message to an authentication server, wherein the authentication message is associated with an onboarding request by the apparatus;
receive, via a secure communication tunnel established with the authentication server using an Extensible Authentication Protocol, provisioning parameters comprising at least an address of a provisioning server, wherein the address of the provisioning server comprises a provisioning server fully qualified domain name (FQDN), an Internet Protocol (IP) address, or an IP address range;
using the provisioning parameters, establish an Internet Protocol (IP) communication session with the provisioning server;
receive via the IP communication session with the provisioning server, at least one of a subscription profile or credentials to a standalone non-public network associated with the provisioning server; and
using the at least one of the subscription profile or credentials, establish network connectivity with the standalone non-public network associated with the provisioning server.

4. The apparatus according to claim 3, wherein the provisioning parameters further comprise a correlation identifier associated with a subscription data entity configured with the provisioning server.

5. The apparatus according to claim 3, wherein the authentication server is a Default Credential Server (DCS).

6. An apparatus comprising processing circuitry and at least one memory including computer program code, the at least one memory and the computer program code configured to, with the processing circuitry, cause the apparatus to at least:
authenticate a device requesting onboarding to a standalone non-public network;
generate at least one of (a) a partially readable provisioning parameter container comprising readable provisioning parameters and secure provisioning parameters, or (b) a readable provisioning parameter container comprising the readable provisioning parameters and a secure provisioning parameter container comprising the secure provisioning parameters, wherein the at least one of the secure provisioning parameter container or the secure provisioning parameters are secured by at least one of signing with a private key, or encrypting with a public key of the device;
provide a provisioning parameter indicator toward one or more network functions of an onboarding network, wherein the provisioning parameter indicator comprises at least one Uniform Resource Locator (URL) pointing to the at least one of (a) the partially readable provisioning parameter container, or (b) the readable provisioning parameter container and the secure provisioning parameter container; and
responsive to one or more requests by the onboarding network via the at least one URLs, provide the at least one of the (a) the partially readable provisioning parameter container, or (b) the readable provisioning parameter container and the secure provisioning parameter container comprising the secure provisioning parameters to the onboarding network.

7. The apparatus according to claim 6,
wherein the one or more requests via the at least one URLs are transmitted by or on behalf of a Session Management Function (SMF), and the at least one of (a) the partially readable provisioning parameter container, or (b) the readable provisioning parameter container and the secure provisioning parameter container are provided to the SMF.

8. The apparatus according to claim 6, wherein the one or more network functions toward which the provisioning parameter indicator is provided is an Access and Mobility Management Function (AMF).

9. The apparatus according to claim 8, wherein the provisioning parameter indicator is provided to the AMF via an Authentication Server Function (AUSF).

10. An apparatus comprising processing circuitry and at least one memory including computer program code, the at least one memory and the computer program code configured to, with the processing circuitry, cause the apparatus to at least:

receive, from an authentication server, a provisioning parameter indicator comprising at least one Uniform Resource Locator (URL) pointing to a partially readable provisioning parameter container or a readable provisioning parameter container and a secure provisioning parameter container, on the authentication server, wherein the partially readable provisioning parameter container or the readable provisioning parameter container and the secure provisioning parameter container are received via access to the at least one URL;

receive, from the authentication server, the at least one of the partially readable provisioning parameter container comprising readable provisioning parameters and secure provisioning parameters, or the readable provisioning parameter container comprising the readable provisioning parameters and the secure provisioning parameter container comprising the secure provisioning parameters, wherein the secure provisioning parameters are unreadable by the apparatus;

utilize the readable provisioning parameters to restrict data sessions with devices; and provide the secure provisioning parameters, within a Protocol Configuration Options (PCO) data object to an authenticated device, via a Packet Data Unit (PDU) session.

11. The apparatus according to claim 10, wherein the authentication server is a Default Credential Server (DCS).

12. The apparatus according to claim 10, wherein the provisioning parameter indicator is received by an Access and Mobility Management Function (AMF) and provided to a Session Management Function (SMF).

13. The apparatus according to claim 10, wherein the PDU session is established with a Session Management Function (SMF).

14. The apparatus according to claim 10, wherein the provisioning parameter indicator is received from the authentication server via an Authentication Server Function (AUSF).

15. The apparatus according to claim 10, wherein utilizing the readable provisioning parameters to restrict data sessions with devices comprises configuring traffic restrictions on a Use Plane Function (UPF) to restrict traffic on a data session with the authentication server.

16. An apparatus for an onboarding network, the apparatus comprising processing circuitry and at least one memory comprising computer program code, the computer program code configured to, with the processing circuitry, cause the apparatus to at least:

provide a Network Exposure Function (NEF) indication to an authentication server, wherein the NEF indication identifies an NEF of the onboarding network;

receive, from the authentication server, at least one of a partially readable provisioning parameter container or a readable provisioning parameter container and a secure provisioning parameter container to the NEF via an application programming interface (API) of the NEF;

receive, from the authentication server, the at least one of a partially readable provisioning parameter container comprising readable provisioning parameters and secure provisioning parameters, or a readable provisioning parameter container comprising the readable provisioning parameters and the secure provisioning parameter container comprising the secure provisioning parameters, wherein the secure provisioning parameters are unreadable by the apparatus;

store a provisioning parameter indicator and metadata received from the authentication server;

store the at least one of the partially readable provisioning parameter container or the readable provisioning parameter container and the secure provisioning parameter container;

establish a data session with an authenticated device;

receive policy rules comprising the at least one of the partially readable provisioning parameter container or the readable provisioning parameter container and the secure provisioning parameter container;

utilize the readable provisioning parameters to restrict data sessions with devices; and provide the secure provisioning parameters, within a Protocol Configuration Options (PCO) data object to the authenticated device, via the data session that is established with the authentication device.

17. An apparatus comprising processing circuitry and at least one memory including computer program code, the at least one memory and the computer program code configured to, with the processing circuitry, cause the apparatus to at least:

perform onboarding registration and authentication with an authentication server;

request establishment of a data session with an onboarding network associated with the authentication server;

receive, via the data session with the onboarding network, a provisioning parameter container; and access at least secure provisioning parameters in a Protocol Configuration Options (PCO) data object by performing at least one of decryption with a private key, or signature verification with a public key of the authentication server, of the provisioning parameter container or a portion thereof, wherein the secure provisioning parameters are associated with a standalone non-public network, wherein the secure provisioning parameters comprise a Provisioning Server (PVS) Internet Protocol (IP) address, a PVS Fully Qualified Domain Name (FQDN), an IP address range, or a PVS domain, wherein the secure provisioning parameters enable the apparatus to establish network connectivity with the standalone non-public network.

18. The apparatus according to claim 17, wherein the authentication server is a Default Credential Server (DCS).

19. The apparatus according to claim 17, wherein the data session is a Packet Data Unit (PDU) session.

* * * * *

UNITED STATES PATENT AND TRADEMARK OFFICE
CERTIFICATE OF CORRECTION

| | | |
|---|---|---|
| PATENT NO. | : 12,003,961 B2 | |
| APPLICATION NO. | : 17/514024 | |
| DATED | : June 4, 2024 | |
| INVENTOR(S) | : Markus Staufer et al. | |

It is certified that error appears in the above-identified patent and that said Letters Patent is hereby corrected as shown below:

In the Claims

In Column 39, Line 46, Claim 16, delete "and" and insert -- and, --, therefor.

Signed and Sealed this
Nineteenth Day of November, 2024

Katherine Kelly Vidal
*Director of the United States Patent and Trademark Office*